(12) United States Patent
Grier et al.

(10) Patent No.: US 11,892,390 B2
(45) Date of Patent: *Feb. 6, 2024

(54) AUTOMATED REAL-TIME PARTICLE CHARACTERIZATION AND THREE-DIMENSIONAL VELOCIMETRY WITH HOLOGRAPHIC VIDEO MICROSCOPY

(71) Applicant: NEW YORK UNIVERSITY, New York, NY (US)

(72) Inventors: David G. Grier, New York, NY (US); Fook Chiong Cheong, Singapore (SG); Ke Xiao, Elmhurst, NY (US)

(73) Assignee: New York University, New York, NY (US)

( * ) Notice: Subject to any disclaimer, the term of this patent is extended or adjusted under 35 U.S.C. 154(b) by 454 days.

This patent is subject to a terminal disclaimer.

(21) Appl. No.: 16/858,399

(22) Filed: Apr. 24, 2020

(65) Prior Publication Data
US 2020/0319086 A1 Oct. 8, 2020

Related U.S. Application Data

(60) Continuation of application No. 15/665,126, filed on Jul. 31, 2017, now Pat. No. 10,634,604, which is a (Continued)

(51) Int. Cl.
*G01N 15/14* (2006.01)
*G02B 21/00* (2006.01)
(Continued)

(52) U.S. Cl.
CPC ..... *G01N 15/1475* (2013.01); *G01N 15/1429* (2013.01); *G01N 15/1434* (2013.01);
(Continued)

(58) Field of Classification Search
USPC .......................................................... 436/164
See application file for complete search history.

(56) References Cited

U.S. PATENT DOCUMENTS

| | | |
|---|---|---|
| 3,069,654 A | 12/1962 | Hough |
| 3,551,018 A | 12/1970 | Stetson |
| | (Continued) | |

FOREIGN PATENT DOCUMENTS

| | | |
|---|---|---|
| CA | 1159674 A1 | 1/1984 |
| CN | 1886684 A | 12/2006 |
| | (Continued) | |

OTHER PUBLICATIONS

Zhoa, J. et al. Recording and reconstruction of a color holographic image by using digital lensless Fourier transform holography, Optics Express, 16(4), 2514-2519. (Year: 2008).*

(Continued)

*Primary Examiner* — Xiaoyun R Xu
(74) *Attorney, Agent, or Firm* — Foley & Lardner, LLP

(57) ABSTRACT

An in-line holographic microscope can be used to analyze on a frame-by-frame basis a video stream to track individual colloidal particles' three-dimensional motions. The system and method can provide real time nanometer resolution, and simultaneously measure particle sizes and refractive indexes. Through a combination of applying a combination of Lorenz-Mie analysis with selected hardware and software methods, this analysis can be carried out in near real time. An efficient particle identification methodology automates initial position estimation with sufficient accuracy to enable unattended holographic tracking and characterization.

19 Claims, 8 Drawing Sheets

Related U.S. Application Data division of application No. 15/090,519, filed on Apr. 4, 2016, now Pat. No. 9,719,911, which is a division of application No. 13/254,403, filed as application No. PCT/US2010/021045 on Jan. 14, 2010, now Pat. No. 9,316,578.

(60) Provisional application No. 61/171,199, filed on Apr. 21, 2009, provisional application No. 61/145,402, filed on Jan. 16, 2009.

(51) Int. Cl.
*G03H 1/00* (2006.01)
*G01N 15/00* (2006.01)

(52) U.S. Cl.
CPC ....... *G01N 15/1459* (2013.01); *G02B 21/008* (2013.01); *G02B 21/0056* (2013.01); *G02B 21/0068* (2013.01); *G03H 1/0005* (2013.01); *G01N 15/1484* (2013.01); *G01N 2015/003* (2013.01); *G01N 2015/0065* (2013.01); *G01N 2015/1445* (2013.01); *G01N 2015/1454* (2013.01); *G01N 2015/1493* (2013.01); *G01N 2015/1497* (2013.01); *G03H 2001/005* (2013.01)

(56) References Cited

U.S. PATENT DOCUMENTS

| | | | |
|---|---|---|---|
| 4,532,422 A | 7/1985 | Nomura et al. |
| 4,540,285 A | 9/1985 | Amer |
| 4,627,729 A | 12/1986 | Breuckmann et al. |
| 4,740,079 A | 4/1988 | Koizumi et al. |
| 4,986,659 A | 1/1991 | Bachalo |
| 4,998,788 A | 3/1991 | Osakabe et al. |
| 5,095,207 A | 3/1992 | Tong |
| 5,146,086 A | 9/1992 | De et al. |
| 5,373,727 A | 12/1994 | Heller et al. |
| 5,796,498 A | 8/1998 | French |
| 5,880,841 A | 3/1999 | Marron et al. |
| 5,939,716 A | 8/1999 | Neal |
| 6,055,106 A | 4/2000 | Grier et al. |
| 6,097,488 A | 8/2000 | Grek et al. |
| 6,214,560 B1 | 4/2001 | Yguerabide et al. |
| 6,281,994 B1 | 8/2001 | Horikoshi et al. |
| 6,424,677 B1 | 7/2002 | Moeller et al. |
| 6,480,285 B1 | 11/2002 | Hill |
| 6,507,839 B1 | 1/2003 | Ponte |
| 6,519,033 B1 | 2/2003 | Quist et al. |
| 6,624,940 B1 | 9/2003 | Grier et al. |
| 6,680,798 B2 | 1/2004 | Kreuzer |
| 6,710,874 B2 | 3/2004 | Mavliev |
| 6,797,942 B2 | 9/2004 | Grier et al. |
| 6,815,664 B2 | 11/2004 | Wang et al. |
| 6,850,363 B1 | 2/2005 | Wendenburg et al. |
| 6,858,833 B2 | 2/2005 | Curtis et al. |
| 6,977,767 B2 | 12/2005 | Sarychev et al. |
| 6,995,351 B2 | 2/2006 | Curtis et al. |
| 7,001,721 B1 | 2/2006 | Whitcombe et al. |
| 7,109,473 B2 | 9/2006 | Grier et al. |
| 7,133,203 B2 | 11/2006 | Grier et al. |
| 7,161,140 B2 | 1/2007 | Grier et al. |
| 7,218,112 B2 | 5/2007 | Ladebeck et al. |
| 7,232,989 B2 | 6/2007 | Grier et al. |
| 7,233,423 B2 | 6/2007 | Grier |
| 7,248,282 B2 | 7/2007 | Maddison |
| 7,276,170 B2 | 10/2007 | Oakey et al. |
| 7,324,282 B2 | 1/2008 | Grier et al. |
| 7,338,168 B2 | 3/2008 | Cartlidge et al. |
| 7,351,953 B2 | 4/2008 | Grier et al. |
| 7,473,890 B2 | 1/2009 | Grier et al. |
| 7,482,577 B2 | 1/2009 | Gruber et al. |
| 7,491,928 B2 | 2/2009 | Roichman et al. |
| 7,515,953 B2 | 4/2009 | Madar et al. |
| 7,532,327 B2 | 5/2009 | Bloom et al. |
| 7,835,051 B2 | 11/2010 | Roichman et al. |
| 7,839,551 B2 | 11/2010 | Lee et al. |
| 7,869,011 B2 | 1/2011 | Christensen et al. |
| 7,875,845 B2 | 1/2011 | Plewa et al. |
| 7,908,300 B2 | 3/2011 | Stluka et al. |
| 7,929,132 B2 | 4/2011 | Lupton et al. |
| 8,059,321 B2 | 11/2011 | Roichman et al. |
| 8,119,988 B2 | 2/2012 | Daido et al. |
| 8,128,242 B2 | 3/2012 | Grier et al. |
| 8,299,789 B2 | 10/2012 | Heid et al. |
| 8,331,019 B2 | 12/2012 | Cheong et al. |
| 8,405,395 B2 | 3/2013 | Setsompop et al. |
| 8,431,884 B2 | 4/2013 | Grier |
| 8,680,861 B1 | 3/2014 | Morrone |
| 8,766,169 B2 | 7/2014 | Grier et al. |
| 8,791,053 B2 | 7/2014 | Christensen et al. |
| 8,791,985 B2 | 7/2014 | Grier et al. |
| 9,176,152 B2 | 11/2015 | Knutson et al. |
| 9,316,578 B2 | 4/2016 | Grier et al. |
| 9,767,341 B2 | 9/2017 | Ozcan et al. |
| 9,810,894 B2 | 11/2017 | Grier et al. |
| 9,897,675 B2 | 2/2018 | Setsompop et al. |
| 9,933,351 B2 | 4/2018 | Kent et al. |
| 11,085,864 B2 | 8/2021 | Grier et al. |
| 11,385,157 B2 | 7/2022 | Grier et al. |
| 2002/0069242 A1 | 6/2002 | Berns |
| 2003/0007894 A1 | 1/2003 | Wang et al. |
| 2003/0021016 A1 | 1/2003 | Grier |
| 2003/0021382 A1 | 1/2003 | Iwanczyk et al. |
| 2003/0047676 A1 | 3/2003 | Grier et al. |
| 2003/0089117 A1 | 5/2003 | Mao et al. |
| 2003/0132373 A1 | 7/2003 | Curtis et al. |
| 2004/0004716 A1 | 1/2004 | Mavliev |
| 2004/0004717 A1 | 1/2004 | Reed |
| 2004/0058455 A1 | 3/2004 | Grier et al. |
| 2004/0072372 A1 | 4/2004 | Seul et al. |
| 2004/0156098 A1 | 8/2004 | Dubois et al. |
| 2004/0180363 A1 | 9/2004 | Gruber et al. |
| 2004/0207922 A1 | 10/2004 | Grier et al. |
| 2005/0017161 A1 | 1/2005 | Grier et al. |
| 2005/0059846 A1 | 3/2005 | Kohda et al. |
| 2005/0141757 A1 | 6/2005 | Ayache et al. |
| 2005/0173622 A1 | 8/2005 | Curtis et al. |
| 2005/0176134 A1 | 8/2005 | Grier et al. |
| 2006/0003252 A1 | 1/2006 | Hirayama et al. |
| 2006/0029634 A1 | 2/2006 | Berg et al. |
| 2006/0127369 A1 | 6/2006 | Christensen et al. |
| 2006/0131494 A1 | 6/2006 | Grier et al. |
| 2006/0163463 A1 | 7/2006 | Grier |
| 2007/0023622 A1 | 2/2007 | Grier et al. |
| 2007/0070303 A1 | 3/2007 | Yonekubo |
| 2007/0091442 A1 | 4/2007 | MacDonald et al. |
| 2007/0177774 A1 | 8/2007 | Kuo |
| 2007/0242269 A1 | 10/2007 | Trainer |
| 2008/0037004 A1 | 2/2008 | Shamir et al. |
| 2008/0094675 A1 | 4/2008 | Roichman et al. |
| 2008/0100840 A1 | 5/2008 | Oma et al. |
| 2008/0137161 A1 | 6/2008 | Roichman et al. |
| 2008/0150532 A1 | 6/2008 | Slavin et al. |
| 2008/0285099 A1 | 11/2008 | Knutson et al. |
| 2009/0027747 A1 | 1/2009 | Lee et al. |
| 2009/0059008 A1 | 3/2009 | Ishii |
| 2009/0073563 A1 | 3/2009 | Betzig |
| 2009/0079981 A1 | 3/2009 | Holve |
| 2009/0128825 A1 | 5/2009 | Akcakir |
| 2009/0132074 A1 | 5/2009 | Yamada |
| 2009/0135432 A1 | 5/2009 | Betzig |
| 2009/0170186 A1 | 7/2009 | Wu et al. |
| 2010/0055031 A1 | 3/2010 | Ahn |
| 2010/0090694 A1 | 4/2010 | Heid et al. |
| 2010/0150408 A1 | 6/2010 | Ishikawa |
| 2010/0172591 A1 | 7/2010 | Ishikawa |
| 2010/0241357 A1 | 9/2010 | Chan et al. |
| 2010/0253986 A1 | 10/2010 | Awatsuji et al. |
| 2010/0259263 A1 | 10/2010 | Holland et al. |
| 2011/0071764 A1 | 3/2011 | Prather et al. |
| 2011/0126914 A1 | 6/2011 | Hartman et al. |
| 2011/0130348 A1 | 6/2011 | Ting et al. |

(56) References Cited

U.S. PATENT DOCUMENTS

| | | |
|---|---|---|
| 2011/0157599 A1 | 6/2011 | Weaver et al. |
| 2011/0176190 A1 | 7/2011 | Golan et al. |
| 2011/0225196 A1 | 9/2011 | Haseyama |
| 2011/0292363 A1 | 12/2011 | Ivey et al. |
| 2012/0038931 A1 | 2/2012 | Jourdain et al. |
| 2012/0177543 A1 | 7/2012 | Battrell et al. |
| 2012/0183947 A1 | 7/2012 | Mueth et al. |
| 2012/0235678 A1 | 9/2012 | Seiberlich et al. |
| 2012/0256626 A1 | 10/2012 | Adalsteinsson et al. |
| 2013/0038326 A1 | 2/2013 | Amadon et al. |
| 2013/0271135 A1 | 10/2013 | Ozen et al. |
| 2013/0278743 A1 | 10/2013 | Cheong et al. |
| 2013/0308135 A1 | 11/2013 | Dubois et al. |
| 2014/0148547 A1 | 5/2014 | Ishida et al. |
| 2014/0170735 A1 | 6/2014 | Holmes |
| 2014/0177932 A1 | 6/2014 | Milne et al. |
| 2014/0253126 A1 | 9/2014 | Habara et al. |
| 2014/0313510 A1 | 10/2014 | Schmidt et al. |
| 2015/0002150 A1 | 1/2015 | Weissler et al. |
| 2015/0062587 A1 | 3/2015 | Shpaisman et al. |
| 2015/0300963 A1 | 10/2015 | Haidekker et al. |
| 2015/0301141 A1 | 10/2015 | Griswold et al. |
| 2015/0346300 A1 | 12/2015 | Setsompop et al. |
| 2016/0116559 A1 | 4/2016 | Cohen |
| 2016/0282436 A1 | 9/2016 | Cloos |
| 2016/0291105 A1 | 10/2016 | Knoll et al. |
| 2016/0291107 A1 | 10/2016 | Rosen et al. |
| 2017/0209864 A1 | 7/2017 | Grisham et al. |
| 2017/0357211 A1 | 12/2017 | Moon et al. |
| 2018/0252628 A1 | 9/2018 | Ruffner et al. |
| 2019/0033414 A1 | 1/2019 | Sofka et al. |
| 2019/0033415 A1 | 1/2019 | Sofka et al. |
| 2021/0123848 A1 | 4/2021 | Grier et al. |
| 2021/0199552 A1 | 7/2021 | Van Oostrum et al. |

FOREIGN PATENT DOCUMENTS

| | | |
|---|---|---|
| CN | 103238120 A | 8/2013 |
| CN | 105164508 A | 12/2015 |
| EP | 0 354 37 A1 | 9/1981 |
| EP | 0 278 714 A2 | 8/1988 |
| EP | 1 855 081 A1 | 11/2007 |
| EP | 1 865 430 A2 | 12/2007 |
| GB | 2 408 587 A | 6/2005 |
| JP | 55-096976 A | 7/1980 |
| JP | 03-251388 A | 11/1991 |
| JP | 03-251888 A | 11/1991 |
| JP | 2000-225302 A | 8/2000 |
| JP | 2001-034148 A | 2/2001 |
| JP | 2004-517742 A | 6/2004 |
| JP | 2007-279475 A | 10/2007 |
| JP | 2011-502256 A | 1/2011 |
| JP | 2011-525967 A | 9/2011 |
| JP | 2014-503794 A | 2/2014 |
| WO | WO-01/15288 A1 | 3/2001 |
| WO | WO-03/048868 A1 | 6/2003 |
| WO | WO-2005/027031 A2 | 3/2005 |
| WO | WO-2005/114151 A1 | 12/2005 |
| WO | WO-2006/034129 A2 | 3/2006 |
| WO | WO-2008/142560 A2 | 11/2008 |
| WO | WO-2010/101671 A1 | 9/2010 |
| WO | WO-2013/080164 A1 | 6/2013 |
| WO | WO-2015/200512 A1 | 12/2015 |
| WO | WO-2017/040158 A1 | 3/2017 |
| WO | WO-2021/249692 A1 | 12/2021 |
| WO | WO-2021/249693 A1 | 12/2021 |

OTHER PUBLICATIONS

Butime, J. et al. Conoscopic Holograms Analysis Using Variations of the Hough Transform, IMA imaging system and technology vol. 19, 10-13 (2009). (Year: 2009).*

Allier, et al., "Label-free cell viability assay using lens-free microscopy," SPIE Proceedings 10497, 7 pages (2018).

Alm, et al., "Cells and Holograms—Holograms and Digital Holographic Microscopy as a Tool to Study the Morphology of Living Cells," Holography—Basic Principles and Contemporary Applications, pp. 335-351 (2013).

Arrizon, et al., "Accurate encoding of arbitrary complex fields with amplitude-only liquid crystal spatial light modulators," Optics Express 13(20), pp. 7913-7927 (2005).

Davis, et al., "Encoding amplitude and phase information onto a binary phase-only spatial light modulator," Applied Optics 42(11), pp. 2003-2008 (2003).

Davis, et al., "Encoding amplitude information onto phase-only filters," Applied Optics 38(23), pp. 5004-5013 (1999).

Feizi, et al., "Lensfree On-chip Microscopy Achieves Accurate Measurement of Yeast Cell Viability and Concentration Using Machine Learning," Conference on Lasers and Electro-Optics, ATh4B.4, 2 pages (2017).

Feizi, et al., "Rapid, portable and cost-effective yeast cell viability and concentration analysis using lensfree on-chip microscopy and machine learning," Lab on a Chip 16(22), pp. 4350-4358 (2016).

Huang, et al., "Optical tweezers as sub-pico-newton force transducers," Optics Communications 195(1-4), pp. 41-48 (2001).

Lee, et al., "Characterizing and tracking single colloidal particles with video holographic microscopy," Optics Express 15(26), pp. 18275-18282 (2007).

Moh, et al., "Multiple optical line traps using a single phase-only rectangular ridge," Applied Physics B 80(8), pp. 973-976 (2005).

Neuman & Block, "Optical trapping," Review of Scientific Instruments 75(9), pp. 2787-2809 (2004).

Pralle, et al., "Three-dimensional high-resolution particle tracking for optical tweezers by forward scattered light," Microscopy Research & Technique 44(5), pp. 378-386 (1999).

Seo, et al., "Lensfree holographic imaging for on-chip cytometry and diagnostics," Lab on a Chip 9(6), pp. 777-787 (2009).

Zhang, et al., "Reconstruction algorithm for high-numerical-aperture holograms with diffraction-limited resolution," Optics Letters 31(11), pp. 1633-1635 (2006).

Botstein & Fink, "Yeast: An Experimental Organism for 21st Century Biology," Genetics 189(3), pp. 695-704 (2011).

Chan, et al., "Morphological observation and analysis using automated image cytometry for the comparison of trypan blue and fluorescence-based viability detection method," Cytotechnology 67, pp. 461-473 (2014).

Chan, et al., "Observation and quantification of the morphological effect of trypan blue rupturing dead or dying cells," PLoS ONE 15(1):e0227950, 17 pages (2020).

Cheong, et al., "Rapid, High-Throughput Tracking of Bacterial Motility in 3D via Phase-Contrast Holographic Video Microscopy," Biophysical Journal 108(5), pp. 1248-1256 (2015).

Cuche, et al., "Simultaneous amplitude-contrast and quantitative phase-contrast microscopy by numerical reconstruction of Fresnel off-axis holograms," Applied Optics 38(34), pp. 6994-7001 (1999).

Duina, et al., "Budding Yeast for Budding Geneticists: A Primer on the *Saccharomyces cerevisiae* Model System," Genetics 197(1), pp. 33-48 (2014).

Ferreira, et al., "Tackling Cancer with Yeast-Based Technologies," Trends in Biotechnology 37(6), pp. 592-603 (2019).

Fleet, "Yeasts in foods and beverages: impact on product quality and safety," Current Opinion in Biotechnology 18(2), pp. 170-175 (2007).

Gabor, "A New Microscopic Principle," Nature 161, pp. 777-778 (1948).

Gibson, et al., "Yeast responses to stresses associated with industrial brewery handling," FEMS Microbiology REviews 31(5), pp. 535-569 (2007).

Gomes, et al., "Comparison of Yeasts as Hosts for Recombinant Protein Production," Microorganisms 6(2):38, 23 pages (2018).

Gorbenko, et al., "Quantification of changes in cellular morphology during cell necrosis obtained from 3D refractive index distributions," Journal of Physics: Conference Series 1236:012015, 6 pages (2019).

Guaragnella, et al., "The expanding role of yeast in cancer research and diagnosis: insights into the function of the oncosuppressors p53 and BRCA1/2," FEMS Yeast Research 14(1), pp. 2-16 (2014).

(56) References Cited

OTHER PUBLICATIONS

Huang, et al., "Efficient protein production by yeast requires global tuning of metabolism," Nature Communications 8:1131, 12 pages (2017).

Kim, et al., "Yeast synthetic biology for the production of recombinant therapeutic proteins," FEMS Yeast Research 15(1), pp. 1-16 (2015).

Kwolek-Mirkek & Zadrag-Tecza, "Comparison of methods used for assessing the viability and vitality of yeast cells," FEMS Yeast Research 14(7), pp. 1068-1079 (2014).

Lodolo, et al., "The yeast *Saccharomyces cerevisiae*—the main character in beer brewing," FEMS Yeast Research 8(7), pp. 1018-1036 (2008).

Maicas, "The Role of Yeasts in Fermentation Processes," Microorganisms 8(8):1142, 8 pages (2020).

Markel, et al., "Introduction to the Maxwell Garnett approximation: tutorial," Journal of the Optical Society of America A 33(7), pp. 1244-1256 (2016).

Mascotti, et al., "HPC viability measurement: trypan blue versus acridine orange and propidium iodide," Transfusion 40(6), pp. 693-696 (2000).

Mernier, et al., "Cell viability assessment by flow cytometry using yeast as cell model," Sensors & Actuators B: Chemical 154(2), pp. 160-163 (2011).

Midtvedt, et al., "Label-free spatio-temporal monitoring of cytosolic mass, osmolarity, and volume in living cells," Nature Communications 10:340, 9 pages (2019).

Odete, et al., "The role of the medium in the effective-sphere interpretation of holographic particle characterization data," Soft Matter 16(4), pp. 891-898 (2019).

Odumeru, et al., "Effects of heat shock and ethanol stress on the viability of a *Saccharomyces uvarum* (*carlsbergensis*) brewing yeast strain during fermentation of high gravity wort," Journal of Industrial Microbiology 10(2), pp. 111-116 (1992).

Ovryn & Izen, "Imaging of transparent spheres through a planar interface using a high-numerical-aperture optical microscope," Journal of the Optical Society of America A 17(7), pp. 1202-1213 (2000).

Parapouli, et al., "*Saccharomyces cerevisiae* and its industrial applications," AIMS Microbiology 6(1), pp. 1-31 (2020).

Philips, et al., "Holographic characterization of contaminants in water: Differentiation of suspended particles in heterogeneous dispersions," Water Research 122, pp. 431-439 (2017).

Pratt, et al., "The Effects of Osmotic Pressure and Ethanol on Yeast Viability and Morphology," Journal of the Institute of Brewing 109(3), pp. 218-228 (2003).

Pray, "L. H. Hartwell's Yeast: A Model Organism for Studying Somatic Mutations and Cancer," Nature Education 1(1), 3 pages (2008).

Rommel, et al., "Contrast-enhanced digital holographic imaging of cellular structures by manipulating the intracellular refractive index," Journal of Biomedical Optics 15(4):041509, 10 pages (2010).

Schnars & Juptner, "Direct recording of holograms by a CCD target and numerical reconstruction," Applied Optics 33(2), pp. 179-181 (1994).

Tennant, "Evaluation of the Trypan Blue Technique for Determination of Cell Viability," Transplantation 2(6), pp. 685-694 (1964).

Winters, et al., "Quantitative Differentiation of Protein Aggregates From Other Subvisible Particles in Viscous Mixtures Through Holographic Characterization," Journal of Pharmaceutical Sciences 109(8), pp. 2405-2412 (2020).

Xu, et al., "Digital in-line holography of microspheres," Applied Optics 41(25), pp. 5367-5375 (2002).

"Immunogenicity Assessment for Therapeutic Protein Products," Food and Drug Administration, 39 pages (2014).

Mar. 27, 2012, Office Action in U.S. Appl. No. 12/686,036, filed Mar. 27, 2012, 5 pages.

Jan. 17, 2013, Office Action in U.S. Appl. No. 12/740,628, dated Jan. 17, 2013, 30 pages.

Jul. 19, 2013, Office Action in U.S. Appl. No. 12/740,628, dated Jul. 19, 2013, 28 pages.

Aspnes, "Local-field effects and effective-medium theory: A microscopic perspective," American Journal of Physics 50(8), pp. 704-709 (1982).

Atherton & Kerbyson, "Size invariant circle detection," Image and Vision Computing 17(11), pp. 795-803 (1999).

Ball, et al., "Complexation Mechanism of Bovine Serum Albumin and Poly(allylamine hydrochloride)," The Journal of Physical Chemistry B 106(9), pp. 2357-2364 (2002).

Ballard, "Generalizing the Hough transform to detect arbitrary shapes," Pattern Recognition 13(2), pp. 111-122 (1981).

Basim & Moudgil, "Effect of Soft Agglomerates on CMP Slurry Performance," Journal of Colloid and Interface Science 256(1), pp. 137-142 (2002).

Basim, et al., "Effect of Particle Size of Chemical Mechanical Polishing Slurries for Enhanced Polishing with Minimal Defects," Journal of the Electrochemical Society 147(9), pp. 3523-3528 (2000).

Ben-Eliezer, et al., "A New Model-Based Technique for Accurate Reconstruction of T2 Relaxation Maps from Fast Spin-Echo Data," Proceedings of the International Society for Magnetic Resonance in Medicine 21, p. 2453 (2013).

Bishop, "Inverse problems," Neural Networks for Pattern Recognition, p. 207 (1995).

Boas, et al., "Scattering of diffuse photon density waves by spherical inhomogeneities within turbid media: analytic solution and applications," Proceedings of the National Academy of Sciences 91(11), pp. 4887-4891 (1994).

Bohren, et al., "Absorption and Scattering of Light by Small Particles," Wiley Interscience (1983).

Bolognesi, et al., "Digital holographic tracking of microprobes for multipoint viscosity measurements," Optics Express 19(20), pp. 19245-19254 (2011).

Bourquard, et al., "A practical inverse-problem approach to digital holographic reconstruction," Optics Express 23(3), pp. 3417-3433 (2013).

Carpenter, et al., "Overlooking subvisible particles in therapeutic protein products: Gaps that may compromise product quality," Journal of Pharmaceutical Sciences 98(4), pp. 1201-1205 (2009).

Chang & Lin, "LIBSVM: A library for support vector machines," ACM Transactions on Intelligent Systems and Technology 2(3), 27, 27 pages (2011).

Chang & Lin, "Training v-Support Vector Regression: Theory and Algorithms," Neural Computation 14(8), pp. 1959-1977 (2002).

Chen, et al., "Magnetic resonance fingerprinting (MRF) for rapid quantitative abdominal imaging," Proceedings of the International Society for Magnetic Resonance in Medicine 22, p. 0561 (2014).

Cheong & Grier, "Rotational and translational diffusion of copper oxide nanorods measured with holographic video microscopy," Optics Express 18(7), pp. 6555-6562 (2010).

Cheong, et al., "Flow visualization and flow cytometry with holographic video microscopy," Optics Express 17(15), pp. 13071-13079 (2009).

Cheong, et al., "Holographic characterization of colloidal particles in turbid media," Applied Physics Letters 111, 153702, 5 pages (2017).

Cheong, et al., "Holographic characterization of individual colloidal spheres' porosities," Soft Matter 7(15), pp. 6816-6819 (2011).

Cheong, et al., "Holographic microrheology of polysaccharides from *Streptococcus mutans* biofilms," Rheologica Acta 48(1), pp. 109-115 (2009).

Cheong, et al., "Strategies for three-dimensional particle tracking with holographic video microscopy," Optics Express 18(13), pp. 13563-13573 (2010).

Cheong, et al., "Technical note: Characterizing individual milk fat globules with holographic video microscopy," Journal of Dairy Science 92(1), pp. 95-99 (2009).

Chia, et al., "A Review of Analytical Techniques for Identifying Contaminants in the Semiconductor Industry," Journal of the IEST 45(1), pp. 37-44 (2002).

(56) References Cited

OTHER PUBLICATIONS

Cloos, et al., "Plug and Play Parallel Transmission at 7 and 9.4 Tesla Based on Principles from MR Fingerprinting," Proceedings of the International Society for Magnetic Resonance in Medicine 22, p. 0542 (2014).
Colomb, et al., "Polarization microscopy by use of digital holography: application to optical-fiber birefringence measurements," Applied Optics 44(21), pp. 4461-4469 (2005).
Costantino, et al., "Moisture-Induced Aggregation of Lyophilized Insulin," 11(1), pp. 21-29 (1994).
Crocker & Grier, "Methods of Digital Video Microscopy for Colloidal Studies," Journal of Colloid and Interface Science 179(1), pp. 298-310 (1996).
Demeule, et al., "Characterization of Particles in Protein Solutions: Reaching the Limits of Current Technologies," The AAPS Journal 12(4), pp. 708-715 (2010).
Den Engelsman, et al., "Strategies for the Assessment of Protein Aggregates in Pharmaceutical Biotech Product Development," Pharmaceutical Research 28(4), pp. 920-933 (2011).
Denis, et al., "Direct Extraction of the Mean Particle Size from a Digital Hologram," Applied Optics 45(5), pp. 944-952 (2006).
Dixon, et al., "Holographic deconvolution microscopy for high-resolution particle tracking," Optics Express 19(17), pp. 16410-16417 (2011).
Dixon, et al., "Holographic particle-streak velocimetry," Optics Express 19(5), pp. 4393-4398 (2011).
Doneva, et al., "Compressed Sensing Reconstruction for Magnetic Resonance Parameter Mapping," Magnetic Resonance in Medicine 64, pp. 1114-1120 (2020).
Dumm, "Characterization of low-level, oversize particles in abrasive powders," KONA Powder and Particle Journal 23, pp. 129-138 (2005).
Egorov, "Systematika, printsipy raboty i oblasty primeneniya datchikov (Systematics, the principle of operation and sensor applications)", Zhurnal radioelectoniki (Journal of Radio Electronics) 3, 22 pages (English abstract) (2009).
Examination Report for European Patent App. No. 08844591.1 dated Jan. 23, 2012, 6 pages.
Examination Report for European Patent App. No. 16169799.0, dated Jul. 24, 2017, 5 pages.
Extended European Search Report for European Patent App. No. 08844591.1 dated Nov. 5, 2011, 7 pages.
Extended European Search Report for European Patent App. No. 10749072.4, dated Feb. 15, 2018, 12 pages.
Extended European Search Report for European Patent App. No. 15152531.8, dated Mar. 20, 2015, 4 pages.
Extended European Search Report for European Patent App. No. 15792186.7, dated Dec. 14, 2017, 10 pages.
Extended European Search Report for European Patent App. No. 15811077.5, dated Apr. 12, 2018, 11 pages.
Extended European Search Report for European Patent App. No. 15858793.1, dated Jul. 11, 2018, 10 pages.
Extended European Search Report for European Patent App. No. 16169799.0, dated Aug. 18, 2016, 7 pages.
Extended European Search Report for European Patent App. No. 17750639.1 dated Jan. 16, 2020, 13 pages.
Farrando-Perez, et al., "Direct Measurement of Microporosity and Molecular Accessibility in Stober Spheres by Adsorption Isotherms," The Journal of Physical Chemistry C 122(38), pp. 22008-22017 (2018).
Feder, et al.,. "Scaling Behavior and Cluster Fractal Dimension Determined by Light Scattering from Aggregating Proteins," Physical Review Letters 53(15), pp. 1403-1406 (1984).
Fifth Office Action for Chinese Patent App. No. 201080009712.X, dated Mar. 11, 2015, 17 pages (with translation).
Filipe, et al., "Critical Evaluation of Nanoparticle Tracking Analysis (NTA) by NanoSight for the Measurement of Nanoparticles and Protein Aggregates," Pharmaceutical Research 27(5), pp. 796-810 (2010).

Final Office Action for U.S. Appl. No. 15/759,502 dated Apr. 19, 2019, 7 pages.
First Office Action in CN 201680062172.9, dated Nov. 18, 2019, 16 pages.
Fung & Hoang, "Assessing the Use of Digital Holographic Microscopy to Measure the Fractal Dimension of Colloidal Aggregates," Biophotonics Congress: Optics in the Life Sciences Congress, JT4A.19, 3 pages (abstract only) (2019).
Fung & Manoharan, "Holographic measurements of anisotropic three-dimensional diffusion of colloidal clusters," Physical Review E 88(2), 020302(R), 9 pages (2013).
Fung, et al., "Imaging multiple colloidal particles by fitting electromagnetic scattering solutions to digital holograms," Journal of Quantitative Spectroscopy and Radiative Transfer 113(18), pp. 2482-2489 (2012).
Fung, et al., "Measuring translational, rotational, and vibrational dynamics in colloids with digital holographic microscopy," Optics Express 19(9), pp. 8051-8065 (2011).
Goller, et al., "Inorganic "silicone oil" microgels," Colloids and Surfaces A: Physicochemical and Engineering Aspects 123-124, pp. 183-193 (1997).
Goodman, "Statistical Properties of Laser Speckle Patterns," Laser Speckle and Related Phenomena, pp. 9-75 (2007).
Graesslin, et al., "Fully Integrated Whole Body 3T MRI System for Parallel RF Transmission", Proceedings of the International Society for Magnetic Resonance in Medicine 15, p. 1007 (2007).
Graesslin, et al., "Whole Body 3T MRI System with Eight Parallel RF Transmission Channels," Proceedings of the International Society for Magnetic Resonance in Medicine 14, p. 129 (2006).
Grier, "A revolution in optical manipulation," Nature 424, pp. 810-816 (2003).
Grier, "Downloadable holographic microscopy software written in IDL, the Interactive Data Language," retrieved from http://physics.nyu.edu/grierlab/software.html, 3 pages (2014).
Hagiwara, et al., "Fractal Analysis of Aggregates Formed by Heating Dilute BSA Solutions Using Light Scattering Methods," Bioscience, Biotechnology, and Biochemistry 60(11), pp. 1757-1763 (1996).
Haist, et al., "Using Graphics Boards to Compute Holograms," Computing in Science & Engineering 8, pp. 8-13 (2006).
Hannel, et al., "Holographic characterization of imperfect colloidal spheres," Applied Physics Letters 107(14), 141905, 4 pages (2015).
Hillman, et al., "Microscopic particle discrimination using spatially-resolved Fourier-holographic light scattering angular spectroscopy," Optics Express 14(23), pp. 11088-11102 (2006).
Hogg, "Issues in Particle Size Analysis," KONA Powder and Particle Journal 26, pp. 81-93 (2008).
Hollitt, "A convolution approach to the circle Hough transform for arbitrary radius," Machine Vision and Applications 24(4), pp. 683-694 (2013).
Holm, et al., "Aggregation and fibrillation of bovine serum albumin," Biochimica et Biophysica Acta (BBA)—Proteins and Proteomics 1774(9), pp. 1128-1138 (2007).
Hukkanen & Braatz, "Measurement of particle size distribution in suspension polymerization using in situ laser backscattering," Sensors and Actuators B: Chemical 96(1-2), pp. 451-459 (2003).
International Search Report & Written Opinion for PCT/US2008/081794 dated Feb. 12, 2009, 5 pages.
International Search Report & Written Opinion for PCT/US2010/021045 dated Apr. 30, 2010, 6 pages.
International Search Report & Written Opinion for PCT/US2012/051542 dated Nov. 22, 2012, 6 pages.
International Search Report and Written Opinion for PCT/US2015/015666, dated Jan. 7, 2016, 11 pages.
International Search Report and Written Opinion for PCT/US2015/037472, dated Sep. 23, 2015, 9 pages.
International Search Report and Written Opinion for PCT/US2015/055154, dated Jan. 7, 2016, 11 pages.
International Search Report and Written Opinion for PCT/US2015/060183, dated Feb. 2, 2016, 9 pages.
International Search Report and Written Opinion for PCT/US2016/051946 dated Nov. 28, 2016, 7 pages.

(56) References Cited

OTHER PUBLICATIONS

International Search Report and Written Opinion for PCT/US2017/016857 dated Jun. 9, 2017, 13 pages.
International Search Report and Written Opinion for PCT/US2017/048496 dated Nov. 9, 2017, 10 pages.
Ishimaru, "Diffusion of light in turbid material," Applied Optics 28(12), pp. 2210-2215 (1989).
Jones, et al., "Silicone oil induced aggregation of proteins," Journal of Pharmaceutical Sciences 94(4), pp. 918-927 (2005).
Kao, et al., "Tracking of Single Fluorescent Particles in Three Dimensions: Use of Cylindrical Optics to Encode Particle Position," Biophysical Journal 67(3), pp. 1291-1300 (1994).
Kasimbeg, et al., "Holographic Characterization of Protein Aggregates in the Presence of Silicone Oil and Surfactants," Journal of Pharmaceutical Sciences 108(1), pp. 155-161 (2019).
Katscher, et al., "Parallel RF transmission in MRI", NMR in Biomedicine 19(3), pp. 393-400 (2006).
Katscher, et al., "RF Encoding Using a Multielement Parallel Transmit System," Magnetic Resonance in Medicine 63(6), pp. 1463-1470 (2010).
Knoll, et al., "Simultaneous MR-PET Reconstruction Using Multi Sensor Compressed Sensing and Joint Sparsity," Proceedings of the International Society for Magnetic Resonance in Medicine 22, p. 0082 (2014).
Kolomenkin, et al., "Geometric Voting Algorithm for Star Trackers," IEEE Transactions on Aerospace and Electronic Systems 44(2), 441-456 (2008).
Kosters, et al., "EMRECON: An Expectation Maximization Based Image Reconstruction Framework for Emission Tomography Data", 2011 IEEE Nuclear Science Symposium Conference Record, pp. 4365-4368 (2011).
Krishnatreya, et al., "Fast feature identification for holographic tracking: the orientation alignment transform," Optics Express 22(11), pp. 12773-12778 (2014).
Krishnatreya, et al., "Measuring Boltzmann's constant through holographic video microscopy of a single colloidal sphere," American Journal of Physics 82(23), pp. 23-31 (2014).
Lee, et al., "Holographic microscopy of holographically trapped three-dimensional structures", Optics Express 15(4), pp. 1505-1512 (2007).
Lee, et al., "Statistics of speckle propagation through the turbulent atmosphere," Journal of the Optical Society of America 66(11), pp. 1164-1172 (1976).
Li, et al., "Understanding Stober Silica's Pore Characteristics Measured by Gas Adsorption," Langmuir 31(2), pp. 824-832 (2015).
Ma, et al., "Magnetic resonance fingerprinting," Nature 495, pp. 187-193 (2013).
Malitson, "Interspecimen Comparison of the Refractive Index of Fused Silica," Journal of the Optical Society of America 55(10), pp. 1205-1209 (1965).
Maret & Wolf, "Multiple light scattering from disordered media. The effect of brownian motion of scatterers," Zeitschrift fur Physik B Condensed Matter 65(4), pp. 409-413 (1987).
Markel, "Introduction to the Maxwell Garnett approximation: tutorial," Journal of the Optical Society of America A 33(7), pp. 1244-1256 (2016).
Maschke, et al., "Micronization of Insulin by High Pressure Homogenization," Pharmaceutical Research 23(9), pp. 2220-2229 (2006).
Meakin, "Fractal Aggregates", Advances in Colloid and Interface Science 28, pp. 249-331 (1988).
Moreno, et al., "Particle positioning from charge-coupled device images by the generalized Lorenz-Mie theory and comparison with experiment," Applied Optics 39(28), pp. 5117-5124 (2000).
Moyses, et al., "Robustness of Lorenz-Mie microscopy against defects in illumination," Optics Express 21(5), pp. 5968-5973 (2013).
Mueller, et al., "The Alzheimer's Disease Neuroimaging Initiative," Neuroimaging Clinics of North America 15(4), pp. 869-877 (2005).
Nebrensky, et al., "A Particle Imaging and Analysis System for Underwater Holograms," Optical Methods and Data Processing in Heat and Fluid Flow, pp. 79-92 (2002).
Nelles, et al., "Dual-Source Parallel RF Transmission for Clinical MR Imaging of the Spine at 3.0 T: Intraindividual Comparison with Conventional Single-Source Transmission," Radiology 257(3), pp. 743-753 (2010).
Non-Final Office Action on U.S. Appl. No. 15/526,287 dated May 15, 2019.
Non-Final Office Action on U.S. Appl. No. 16/328,196 dated Dec. 16, 2019.
Notice of Reasons for Refusal for Japanese Patent App. No. 2010-531335 dated Oct. 18, 2012, 6 pages (with translation).
Notice of Reasons for Refusal for Japanese Patent App. No. 2011-546331 dated Oct. 25, 2012, 6 pages (with translation).
Notice of Reasons for Refusal for Japanese Patent App. No. 2016-575179 dated Jan. 10, 2019, 9 pages (with translation).
Obey & Vincent, "Novel Monodisperse "Silicone Oil"/Water Emulsions," Journal of Colloid and Interface Science 163(2), pp. 454-463 (1994).
Office Action for Chinese Patent App. No. 200880114008.3 dated Jul. 18, 2013, 25 pages (with translation).
Office Action for Chinese Patent App. No. 201410471610.X dated Mar. 22, 2016, 21 pages (with translation).
Office Action for U.S. Appl. No. 15/118,785 dated Jan. 4, 2019, 7 pages.
Office Action for U.S. Appl. No. 15/118,785 dated Sep. 5, 2019, 6 pages.
Office Action for U.S. Appl. No. 15/518,739 dated May 3, 2018, 5 pages.
Office Action for U.S. Appl. No. 15/759,502 dated Oct. 4, 2018, 8 pages.
Omichi, et al., "Fabrication of enzyme-degradable and size-controlled protein nanowires using single particle nano-fabrication technique," Nature Communications 5, 3718, 8 pages (2014).
Orzada, et al., "Design and comparison of two eight-channel transmit/receive radiofrequency arrays for in vivo rodent imaging on a 7 T human whole-body MRI system," Medical Physics 37(5), pp. 2225-2232 (2010).
Pan, et al., "Three-Dimensional Particle Tracking for Dilute Particle-Liquid Flows in a Pipe," Measurement Science and Technology 13(8), pp. 1206-1216 (2002).
Panchal, et al., "Analyzing Subvisible Particles in Protein Drug Products: a Comparison of Dynamic Light Scattering (DLS) and Resonant Mass Measurement (RMM)," The AAPS Journal 16(3), pp. 440-451 (2014).
Parnell, et al., "Porosity of silica Stober particles determined by spin-echo small angle neutron scattering," Soft Matter 12, pp. 4709-4714 (2016).
Parthasarathy, "Rapid, accurate particle tracking by calculation of radial symmetry centers," Nature Methods 9, pp. 724-726 (2012).
Pawashe & Sitti, "Two-dimensional vision-based autonomous microparticle manipulation using a nanoprobe," Journal of Micromechatronics 3(3-4), pp. 285-306 (2006).
Pedregosa, et al., "Scikit-learn: Machine Learning in Python," Journal of Machine Learning Research 12, pp. 2825-2830 (2011).
Perry, et al., "Real-space studies of the structure and dynamics of self-assembled colloidal clusters," Faraday Discussions 159, pp. 211-234 (2012).
Pine, et al., "Diffusing wave spectroscopy," Physical Review Letters 60(12), pp. 1134-1137 (1988).
Quick, "Integrated PET/MR," Journal of Magnetic Resonance Imaging 39(2), pp. 243-258 (2014).
Rappaz, et al., "Erythrocytes volume and refractive index measurement with a Digital Holographic Microscope," Proceedings of SPIE—The International Society for Optical Engineering 6445, 644509, 5 pages. (2007).
Rappaz, et al., "Simultaneous cell morphometry and refractive index measurement with dual-wavelength digital holographic microscopy and dye-enhanced dispersion of perfusion medium," Optics Letters 33(7), pp. 744-746 (2008).

(56) References Cited

OTHER PUBLICATIONS

Remsen, et al., "Analysis of Large Particle Count in Fumed Silica Slurries and Its Correlation with Scratch Defects Generated by CMP," Journal of the Electrochemical Society 153(5), pp. G453-G461 (2006).
Ripple & Dimitrova, "Protein particles: What we know and what we do not know," Journal of Pharmaceutical Sciences 101(10), pp. 3568-3579 (2012).
Roichman, et al., "Influence of Nonconservative Optical Forces on the Dynamics of Optically Trapped Colloidal Spheres: The Fountain of Probability," Physical Review Letters 101, 128301, 5 pages (2008).
Rubinstein, et al., "Recognition of distorted patterns by invariance kernels," Pattern Recognition 24(10), pp. 959-967 (1991).
Savin & Doyle, "Role of a finite exposure time on measuring an elastic modulus using microrheology," Physical Review E 71, 041106, 6 pages (2005).
Savin & Doyle, "Static and Dynamic Errors in Particle Tracking Microrheology," Biophysical Journal 88(1), pp. 623-638 (2005).
Schellekens, "Bioequivalence and the immunogenicity of biopharmaceuticals," Nature Reviews Drug Discovery 1, pp. 457-462 (2002).
Sciammarella, et al., "Measuring Mechanical Properties of Materials in the Micron Range," Optical Engineering 42(5), 8 pages (2003).
Seifi, et al., "Fast and accurate 3D object recognition directly from digital holograms," Journal of the Optical Society of America A 30(11), pp. 2216-2224 (2013).
Shpaisman, et al., "Holographic microrefractometer," Applied Physics Letters 101, 091102, 3 pages (2012).
Siler & Cornish, "Measurement of Protein in Natural Rubber Latex," Analytical Biochemistry 229(2), pp. 278-281 (1995).
Singh, et al., "An industry perspective on the monitoring of subvisible particles as a quality attribute for protein therapeutics," Journal of Pharmaceutical Sciences 99(8), pp. 3302-3321 (2010).
Siposova, et al., "Depolymerization of insulin amyloid fibrils by albumin-modified magnetic fluid," Nanotechnology 23(5), 055101, 10 pages(2012).
Sluzky, et al., "Kinetics of insulin aggregation in aqueous solutions upon agitation in the presence of hydrophobic surfaces," Proceedings of the National Academy of Sciences 88(21), pp. 9377-9381 (1991).
Smola & Scholkopf, "A tutorial on support vector regression," Statistics and Computing 14(3), pp. 199-222 (2004).
Sorensen, "Light Scattering by Fractal Aggregates: A Review," Aerosol Science and Technology 35(2), pp. 648-687 (2001).
Strzodka, et al., "Real-Time Motion Estimation and Visualization on Graphics Cards," IEEE Visualization 2004, pp. 545-552 (2004).
Tolla & Boldridge, "Distortion of Single-Particle Optical Sensing (SPOS) Particle Count by Sub-Countable Particles," Particle & Particle Systems Characterizaion 27(1-2), pp. 21-31 (2010).
U.S. Office Action on U.S. Appl. No. 15/320,646 dated Jan. 8, 2018.
Voros, "The Density and Refractive Index of Adsorbing Protein Layers," Biophysical Journal 87(1), pp. 553-561 (2004).
Wang, "Protein aggregation and its inhibition in biopharmaceutics," International Journal of Pharmaceutics 289(1-2), pp. 1-30 (2005).
Wang, et al., "Celebrating Soft Matter's 10th Anniversary: Monitoring colloidal growth with holographic microscopy," Soft Matter 11(6), pp. 1062-1066 (2015).
Wang, et al., "Holographic characterization of colloidal fractal aggregates," Soft Matter 12(42), pp. 8774-8780 (2016).
Wang, et al., "Holographic characterization of protein aggregates," Journal of Pharmaceutical Sciences 105(3), pp. 1074-1085 (2016).
Wang, et al., "Stimulus-responsive colloidal sensors with fast holographic readout," Applied Physics Letters 107(5), 051903, 5 pages (2015).
Wang, et al., "Using the discrete dipole approximation and holographic microscopy to measure rotational dynamics of non-spherical colloidal particles," Journal of Quantitative Spectroscopy and Radiative Transfer 146, pp. 499-509 (2014).
Weber, et al., "A Novel 8-Channel Transceive Volume-Array for a 9.4T Animal Scanner," Proceedings of the International Society for Magnetic Resonance in Medicine 16, p. 151 (2008).
Weinbuch, et al., "Micro-Flow Imaging and Resonant Mass Measurement (Archimedes)—Complementary Methods to Quantitatively Differentiate Protein Particles and Silicone Oil Droplets," Journal of Pharmaceutical Sciences 102(7), pp. 2152-2165 (2013).
Witten & Sander, "Diffusion-Limited Aggregation, a Kinetic Critical Phenomenon," Physical Review Letters 47(19), pp. 1400-1403 (1981).
Written Opinion for Singapore Patent App. No. 11201802181R dated Mar. 28, 2019, 7 pages.
Wu, et al., "Synthesis of mesoporous silica nanoparticles," Chemical Society Reviews 42(9), pp. 3862-3875 (2013).
Xiao & Grier, "Multidimensional Optical Fractionation of Colloidal Particles with Holographic Verification," Physical Review Letters 104, 028302, 4 pages (2010).
Yang, et al., "Spatial coherence of forward-scattered light in a turbid medium," Journal of the Optical Society of America A 16(4), pp. 866-871 (1999).
Ye, et al., "Accelerating Magnetic Resonance Fingerprinting (MRF) Using t-Blipped Simultaneous Multislice (SMS) Acquisition," Magnetic Resonance in Medicine 75(5), pp. 2078-2085 (2016).
Yevick, et al., "Machine-learning approach to holographic particle characterization," Optics Express 22(22), pp. 26884-26890 (2014).
Yip, et al., "Atomic Force Microscopy of Crystalline Insulins: The Influence of Sequence Variation on Crystallization and Interfacial Structure," Biophysical Journal 74(5), pp. 2199-2209 (1998).
Yip, et al., "Structural and Morphological Characterization of Ultralente Insulin Crystals by Atomic Force Microscopy: Evidence of Hydrophobically Driven Assembly," Biophysical Journal 75(3), pp. 1172-1179 (1998).
Zolls, et al., "How subvisible particles become invisible-relevance of the refractive index for protein particle analysis," Journal of Pharmaceutical Sciences 102(5), pp. 1434-1446 (2013).
Van Oostrum, "Using Light Scattering to Track, Characterize and Manipulate Colloids," Utrecht University Repository, PhD Thesis, 321 pages (2011).
Crocker & Grier, "Methods of Digital Video Microscopy for Colloidal Studies," Methods of Digital Video Microscopy for Colloidal Studies 179(1), pp. 298-310 (1996).
Daimon & Masumura, "Measurement of the refractive index of distilled water from the near-infrared region to the ultraviolet region," Applied Optics 46(18), pp. 3811-3820 (2007).
Dufresne, et al., "Brownian dynamics of a sphere between parallel walls," Europhysics Letters 53(2), pp. 264-270 (2001).
Lin, et al., "Direct measurements of constrained Brownian motion of an isolated sphere between two walls," Physical Review E 62(3), pp. 3909-3919 (2000).
Lobry & Ostrowsky, "Diffusion of Brownian particles trapped between two walls: Theory and dynamic-light-scattering measurements," Physical Review B 53(18), pp. 12050-12056 (1996).
Power & De Power, "Second-Kind Integral Equation Formulation for the Slow Motion of a Particle of Arbitrary Shape Near a Plane Wall in a Viscous Fluid," SIAM Journal on Applied Mathematics 53(1), pp. 60-70 (1993).
Xue, et al., "Diffusion, dispersion, and settling of hard spheres," Physical Review Letters 69(11), pp. 1715-1718 (1992).
Cojoc, et al., "Laser trapping and micro-manipulation using optical vortices," Microelectronic Engineering 78-79, pp. 125-131 (2005).
Xiao & Grier, "Sorting colloidal particles into multiple channels with optical forces: Prismatic optical fractionation," Physical Review E 82(5):051407, 9 pages (2010).
Agarwal, et al., "Manipulation and assembly of nanowires with holographic optical traps," Optics Express 13(22), pp. 8906-8912 (2005).
Arlt, et al., "Optical micromanipulation using a Bessel light beam," Optics Communications 197(4-6), pp. 239-245 (2001).
Ashkin, "History of optical trapping and manipulation of small-neutral particle, atoms, and molecules," IEEE Journal of Selected Topics in Quantum Electronics 6(6), pp. 841-856 (2000).

(56) References Cited

OTHER PUBLICATIONS

Ashkin, "Optical trapping and manipulation of neutral particles using?lasers," Proceedings of the National Academy of Sciences 94(10), pp. 4853-4860 (1997).

Ashkin, et al., "Observation of as single-beam gradient force optical trap for dielectric particles," Optics Letters 11(5), pp. 288-290 (1986).

Biancaniello, et al., "Colloidal Interactions and Self-Assembly Using DNA Hybridization," Physical Review Letters 94(5):058302, 4 pages (2005).

Crocker & Grier, "Microscopic measurement of the pair interaction potential of charge-stabilized colloid," Physical Review Letters 73(2), pp. 352-355 (1994).

Crocker, et al., "Entropic Attraction and Repulsion in Binary Colloids Probed with a Line Optical Tweezer," Physical Review Letters 82(21), pp. 4352-4355 (1999).

Curtis & Grier, "Modulated optical vortices," Optics Letters 28(11), pp. 872-874 (2003).

Curtis & Grier, "Structure of Optical Vortices," Physical Review Letters 90(13):133901, 4 pages (2003).

Curtis, et al., "Dynamic holographic optical tweezers," Optics Communications 207(1-6), pp. 169-175 (2002).

Duda & Hart, "Use of the Hough transformation to detect lines and curves in pictures," Communications of the ACM 15(1), pp. 11-15 (1972).

Duffy, et al., "Rapid Prototying of Microfluidic Systems in Poly(dimethylsiloxane)," Analytical Chemistry 70(23), pp. 4974-4984 (1998).

Dufrense & Grier, "Optical tweezer arrays and optical substrates created with diffractive optics," Review of Scientific Instruments 69(5), pp. 1974-1977 (1998).

Dufresne, et al., "Computer-generated holographic optical tweezer arrays," Review of Scientific Instruments 72(3), pp. 1810-1816 (2001).

Eriksen, et al., "Fully dynamic multiple-beam optical tweezers," Optics Express 10(14), pp. 597-602 (2002).

Faucheux, et al., "Optical Thermal Ratchet," Physical Review Letters 74(9), pp. 1504-1507 (1995).

Faucheux, et al., "Periodic forcing of a Brownian particle," Physical Review E 51(6), pp. 5239-5250 (1995).

Gahagan & Swartzlander, "Optical vortex trapping of particles," Optics Letters 21(11), pp. 827-829 (1996).

Gopinathan & Grier, "Statistically Locked-In Transport through Periodic Potential Landscapes," Physical Review Letters 92(13):130602, 4 pages (2004).

Grier & Roichman, "Holographic optical trapping," Applied Optics 45(5), pp. 880-887 (2006).

Grier, "Optical tweezers in colloid and interface science," Current Opinion in Colloid & Interface Science 2(3), pp. 264-270 (1997).

He, et al., "Optical Particle Trapping with Higher-order Doughnut Beams Produced Using High Efficiency Computer Generated Holograms," Journal of Modern Optics 42(1), pp. 217-223 (1995).

Korda, et al., "Kinetically Locked-In Colloidal Transport in an Array of Optical Tweezers," Physical Review Letters 89(12):128301, 4 pages (2002).

Ladavac, et al., "Sorting mesoscopic objects with periodic potential landscapes: Optical fractionation," Physical Review E 70(1):010901, 4 pages (2004).

Lee & Grier, "Robustness of holographic optical traps against phase scaling errors," Optics Express 13(19), pp. 7458-7465 (2005).

Liesner, et al., "Multi-functional optical tweezers using computer-generated holograms," Optics Communications 185(1-3), pp. 77-82 (2000).

Ma, et al., "Determination of complex refractive index of polystyrene microspheres," Physics in Medicine & Biology 48, pp. 4165-4172 (2003).

Messmer, et al., "GPULib: GPU Computing in High-Level Languages," Computing in Science & Engineering 10(2008.05), pp. 70-73 (2008).

Owens, et al., "A Survey of General-Purpose Computation on Graphics Hardware," Computer Graphics Forum 26(1), pp. 80-113 (2007).

Pelton, et al., "Transport and fractionation in periodic potential-energy landscapes," Physical Review E 70(3):031108, 11 pages (2004).

Polin, et al., "Optimized holographic optical traps," Optics Express 13(15), pp. 5831-5845 (2005).

Rodrigo, et al., "Four-dimensional optical manipulation of colloidal particles," Applied Physics Letters 86(7):074103, 3 pages (2005).

Roichman, et al., "Optical traps with geometric aberrations," Applied Optics 45(15), pp. 3425-3429 (2006).

Sasaki, et al., "Pattern formation and flow control of fine particles by laser-scanning micromanipulation," Optics Letters 16(19), pp. 1463-1465 (1991).

Sheng, et al., "Digital holographic microscope for measuring three-dimensional particle distributions and motions," Applied Optics 45(16), pp. 3893-3901 (2006).

Simpson, et al., "Optical tweezers and optical spanners with Laguerre-Gaussian modes," Journal of Modern Optics 43(122), pp. 2485-2491 (1996).

Sundbeck, et al., "Structure and scaling of helical modes of light," Optics Letters 30(5), pp. 477-479 (2005).

Svoboda & Block, "Biological Applications of Optical Forces," Annual Review of Biophysics and Biomolecular Structure 23(1), pp. 247-285 (1994).

Verma, et al., "Entropic Colloidal Interactions in Concentrated DNA Solutions," Physical Review Letters 81(18), pp. 4004-4007 (1998).

Yu, et al., "The manipulation and assembly of CuO nanorods with line optical tweezers," Nanotechnology 15(12), pp. 1732-1736 (2004).

\* cited by examiner

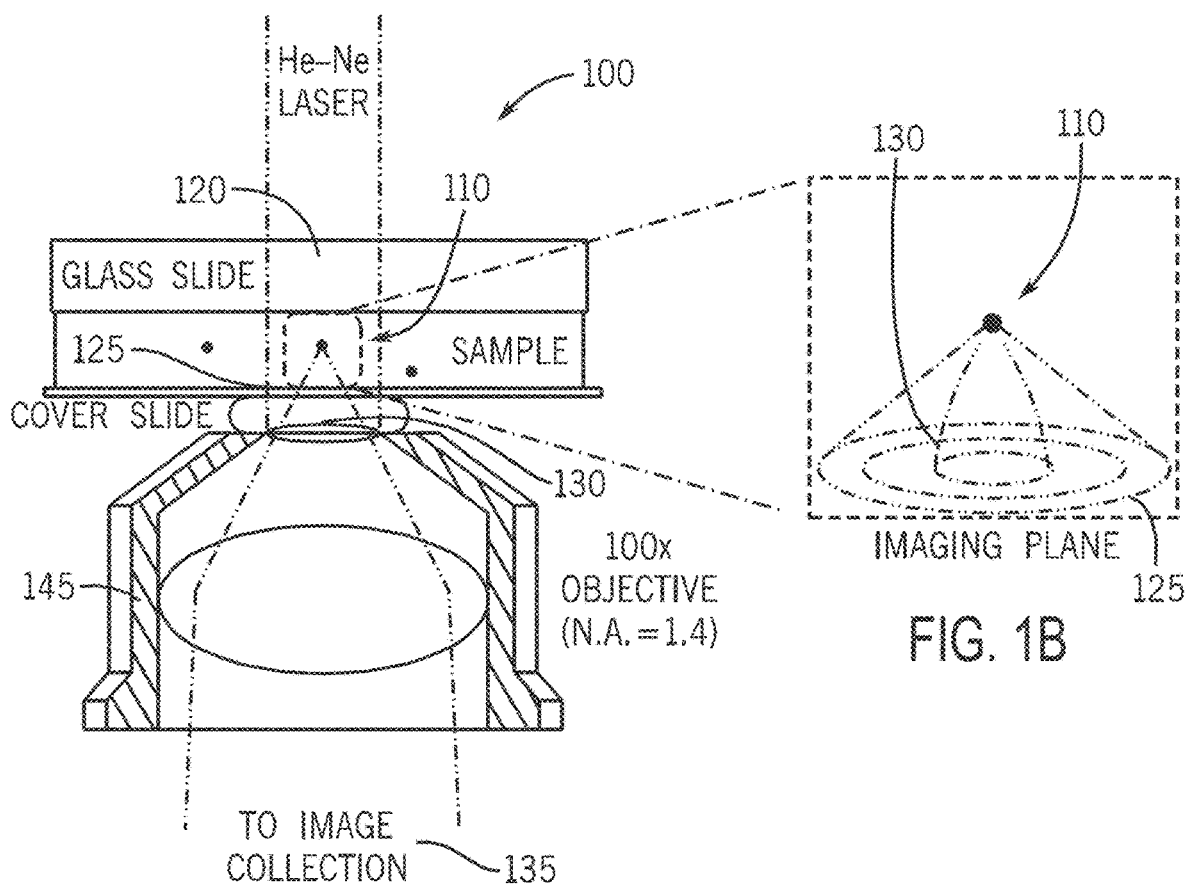
FIG. 1A
FIG. 1B
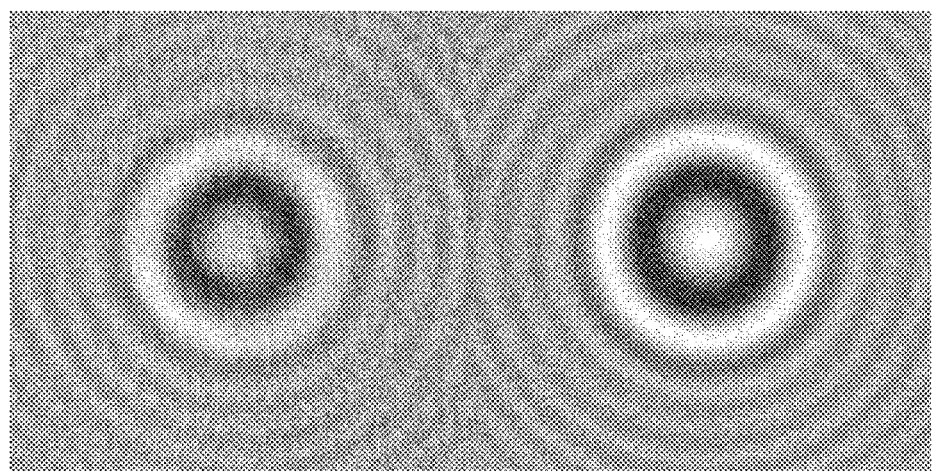
Optical
FIG. 1C(1)
Fitted
FIG. 1C(2)

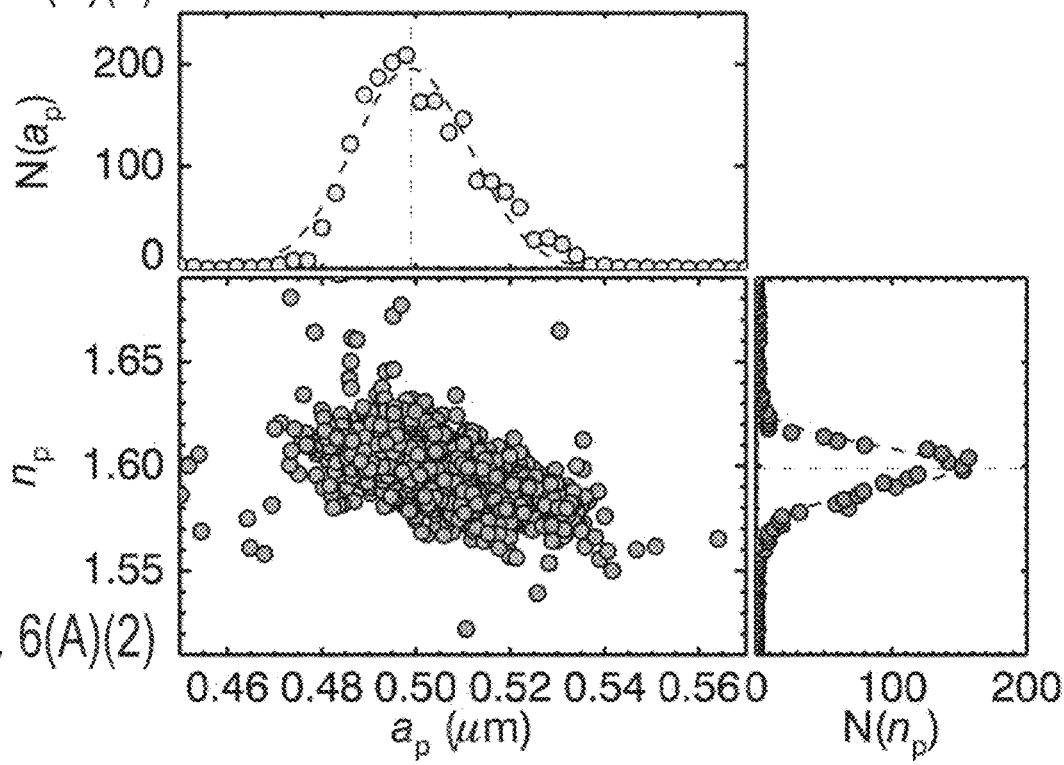
FIG. 6(A)(1)
FIG. 6(A)(2)
FIG. 6(A)(3)
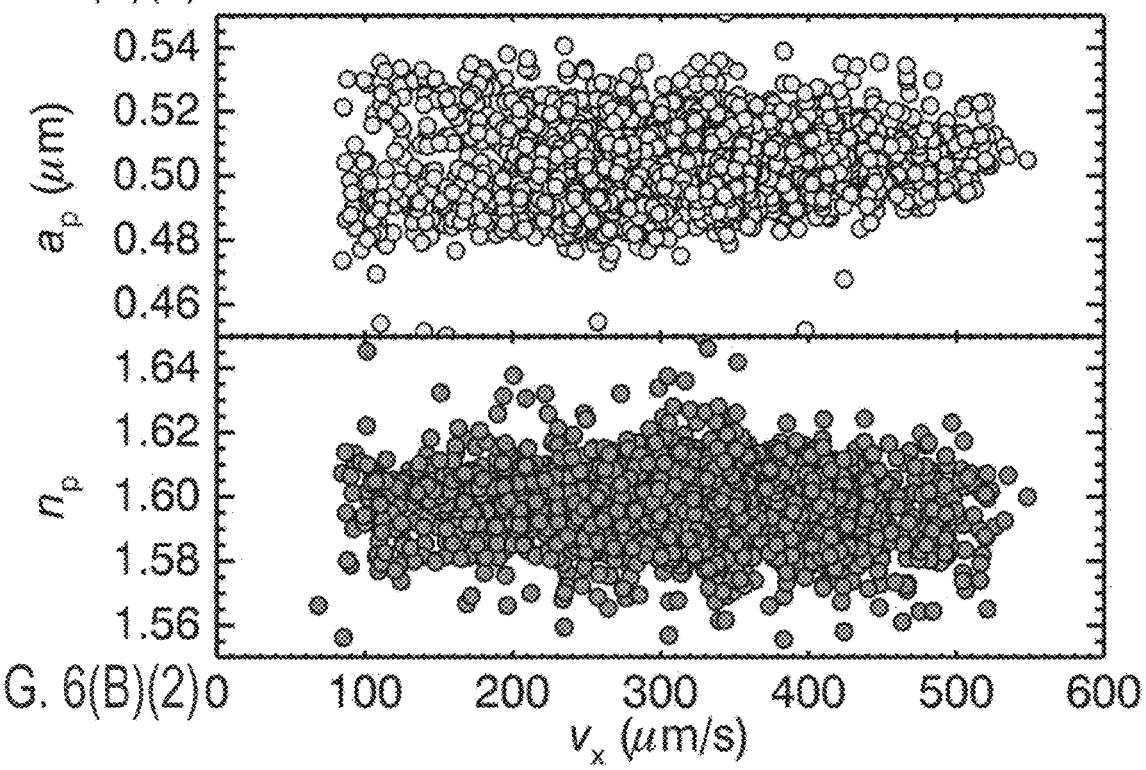
FIG. 6(B)(1)
FIG. 6(B)(2)

AUTOMATED REAL-TIME PARTICLE CHARACTERIZATION AND THREE-DIMENSIONAL VELOCIMETRY WITH HOLOGRAPHIC VIDEO MICROSCOPY

CROSS-REFERENCE TO RELATED PATENT APPLICATIONS

This application is a continuation of U.S. application Ser. No. 15/665,126 filed Jul. 31, 2017, to issue as U.S. Pat. No. 10,634,604 on Apr. 28, 2020, which is a divisional of U.S. application Ser. No. 15/090,519 filed Apr. 4, 2016 and issued as U.S. Pat. No. 9,719,911 on Aug. 1, 2017, which is a divisional of Ser. No. 13/254,403 filed Feb. 15, 2012 and issued as U.S. Pat. No. 9,316,578 on Apr. 19, 2016, which is a national stage entry of PCT/US2010/021045 filed Jan. 14, 2010, which claims priority benefit of U.S. Provisional Application Nos. 61/171,199 filed Apr. 21, 2009 and 61/145,402 filed Jan. 16, 2009, all of which are incorporated herein by reference in their entirety.

STATEMENT OF GOVERNMENT INTEREST

This invention was made with government support under Grant No. DMR-0606415 awarded by the National Science Foundation. The government has certain rights in the invention.

BACKGROUND OF THE INVENTION

This characterization of colloidal particles, particularly spheres, is an important and pervasive issue in many aspects of industrial chemical, physical and biomedical applications. A variety of important functionalities are being sought to perform various characterizations including 1) bead based molecular binding assays, 2) flow field measurements, 3) automated particle image detection in holograms, and 4) real time analysis of particle features. For example, coherent illumination traditionally has not been used widely for particle image velocimetry because the resulting holographic images can be difficult to interpret quantitatively. Consequently, measurements of fluoroscence yield has been used to carry out bead based molecular binding assays using holographic imaging in one color. However, such methods require fluorescent labeling with conventional assays requiring tens of thousands of beads to eliminate artifacts to non-specific fluorospore binding and unintentional bleaching. It has been recently demonstrated that holographic video microscopy images of colloidal particles can be used to locate the particles' centers in three dimensions, even when particles occlude each other along the optical axis. Earlier demonstrations using phenomenological models for the observed scattering patterns achieved tracking resolution comparable to that attained with conventional particle imaging methods. The principal benefit of coherent illumination in these studies was the greatly extended working distance and depth of focus compared with conventional imaging methods. However, these methods are inefficient, do not allow any real time analysis to be performed and cannot even perform a number of characterizations (such as the four listed above). Consequently, characterizations mentioned above have not been possible heretofore, have not been commercially feasible or problems remain without apparent solution.

SUMMARY OF THE INVENTION

In therefore an object of the invention to provide a variety of characterization methods and systems for analysis of colloidal particles, such as spheres, in an automated, real-time manner using holographic video microscopy.

BRIEF DESCRIPTION OF THE DRAWINGS

FIG. 1A shows an example of an in-line holographic video microscope; FIG. 1B is a magnified portion of FIG. 1A around the sample; an interference pattern is shown in FIG. 1C(1) and FIG. 1C(2) shows a fit of FIG. 1C(1) to predictions of Lorenz-Mie theory to obtain various measurements;

FIG. 6A(1) is a distribution of streaming particles as a function of index of refraction and observed sizes for a commercial polystyrene spherical particle continuing sample in water; FIG. 6A(2) is a 2D cross section from FIG. 6A(1) for the particle size and FIG. 6A(3) for index of refraction, both being at the mean value of the other parameter; FIGS. 6B(1) and 6B(2) show trajectory averaged radius and refractive index as a function of mean speed;

DESCRIPTION OF PREFERRED EMBODIMENTS

Figure 2:
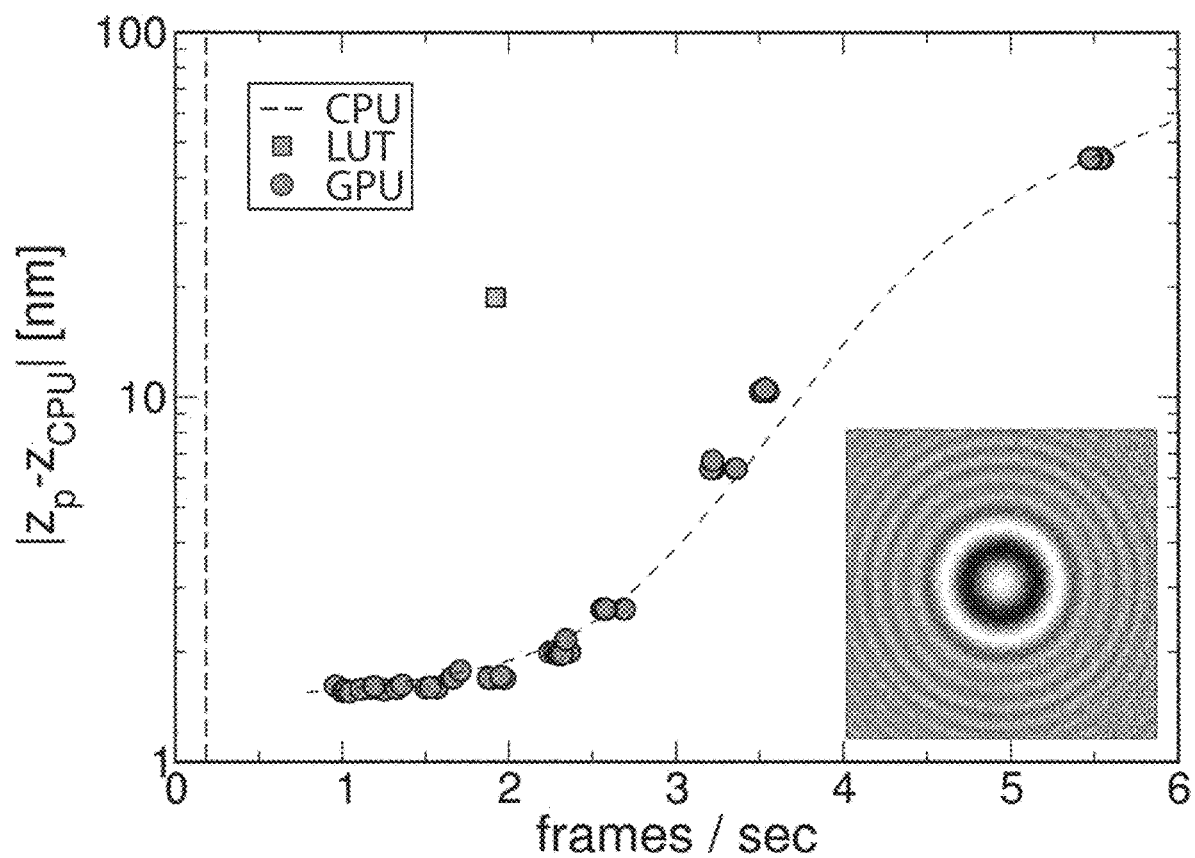
FIG. 2 shows processing speed and relative error in $z_p$ for fits, performed in accordance with the invention, to measured holographic images of a 2.2 μm diameter silica sphere using a one-dimensional look-up-table (squares) and single-precision GPU-accelerated fits (circles); the inset image shows a typical 201×201 pixel hologram and errors are computed relative to the double precision result obtained on a single-thread of the CPU (central processing unit), whose processing rate is indicated by the dashed line and the smooth curve is a guide to the eye.

A holographic microscope 100 constructed for implementation of the invention is depicted schematically in FIG. 1A. Sample 110 is illuminated with the collimated and linearly polarized beam 120 from a HeNe laser operating at a vacuum wavelength of λ=632.8 nm (Uniphase 5 mW). Other laser wavelengths, such as λ=537 can also be employed (Coherent Verdi at 5 W). Light 130 scattered by the sample 110 interferes with the unscattered portion of the illuminating beam 120 to form an in-line hologram in the focal or imaging plane 125 of the microscope 100. The resulting heterodyne scattering pattern (see FIG. 1C(1)) is magnified by the microscope's objective lens 145 (Zeiss S Plan Apo 100× oil immersion, numerical aperture 1.4), and projected with a 1× video eyepiece onto a video camera 135 (or plural camera for some embodiments) (NEC TI-324AII), which records 1 ms exposures every 33 ms with a system magnification of 101 μm/pixel. As described hereinafter this scattering, or interference pattern, is fit to predictions of the Lorenz-Mie theory (see FIG. 1C(2)).

This video signal can be either recorded as an uncompressed digital video stream at 30 frames/s on a commercial digital video recorder (Pioneer H520S) for off-line analysis, or digitized directly with an Arvoo Picasso PCI-2SQ framegrabber to yield an eight-bit image, A(r). Normalizing each image by a previously recorded background image, B(r), eliminates spurious interference fringes due to reflections and imperfections in the optical train and provides the real-valued array a(r)=A(r)/B(r) for analysis. In our implementation, each pixel in the 640/480 array contains roughly five bits of information.

We interpret the data in a(r) using results for generalized Lorenz-Mie scattering theory. The electric field in the microscope's focal plane is the superposition of the incident plane wave, $E_0(r)=u_0(x,y)\exp(ikz)\hat{x}$, and the scattering pattern $E_s(r)=u_0(r_p)f_s(k(r-r_p))$ due to a sphere centered at $r_p$. There, $k=2\pi n_m/\lambda$ is the light's wavenumber in a medium of refractive index $n_m$. After normalization, $$a(r) \approx 1 + 2\Re\{\exp(-ikz_p)f_s(k(r-r_p))\cdot\hat{x}\} + |f_s(k(r-r_p))|^2. \quad (1)$$

The scattering function may be expanded in a series of vector spherical harmonics $$f_s(kr) = \sum_{n=1}^{n_c} f_n(ia_n N_{e1n}^{(3)}(kr) - b_n M_{o1n}^{(3)}(kr)),$$

where $f_n = i^n(2n+1)/[n(n+1)]$. The generalized Lorenz-Mie expansion coefficients, $a_n$ and $b_n$, depend on the size, shape, composition and orientation of the scattering particle in the illuminating field. For a homogeneous isotropic sphere of radius a illuminated by a plane wave of wave number k, these coefficients fall off rapid with order n, and the series is found to converge after a number of terms $n_c=(ka)+4.05(ka)^{1/3}+2$. For a micrometer-scale latex sphere in water, $n_c \leq 30$. The normalized image of an individual sphere can be fit to Eq. (1) for the sphere's position $r_p$, its radius a, and its refractive index $n_m$.

Although the scattering coefficients must be computed with great care [10, 11], the numerical challenge presented by Eq. (2) is in evaluating the vector spherical harmonics $M_{o1n}^{(3)}(k(r-r_p))$ and $N_{e1n}^{(3)}(k(r-r_p))$ at each pixel in a(r) for each trial value of $r_p$. Each sphere's image can subtend tens of thousands of pixels, and the functions typically must be evaluated hundreds of times in the course of each nonlinear fit. Even with the best conventional computationally efficient formulations of the relevant special functions, a fully converged fit can take several seconds on a single processor.

One most preferred form of the invention concerns methods to accelerate these fits using the Lorenz-Mie technique combined with particular programming steps. As will be shown hereinafter this methodology reveals solutions to problems and enables commercially effective characterizations, wherein those solutions were not even previously available. One of our reference systems consists of micrometer-scale latex spheres freely diffusing in water at room temperature, whose normalized hologram is shown in FIG. 1C(1). We analyze images such as this with software developed in the IDL programming language (ITT Visual Information Solutions, Boulder, CO), taking advantage of the MPFIT suite of Levenberg-Marquardt nonlinear least-squares fitting routines. These fits typically yield the particle's in-plane position to within 3 nm, its axial position to within 10 nm, its radius to within 1 nm and its refractive index to within 1 part in $10^4$. Error estimates obtained from uncertainties in the fit parameters are independently confirmed by dynamical measurements.

Much of the computational burden of fitting Eq. (1) to a normalized holographic image can be relieved by evaluating $f_s(kR)$ along the line segment $R=|r-r_p|$ and then interpolating to obtain $f_s(k(r-r_p))$. This approach exploits the approximate radial symmetry of a(r) about the particle's center. The data in FIG. 2 demonstrate the substantial reduction in processing time attained in this way. Although expedient, one-dimensional look-up tables do not account for slight polarization-dependent asymmetries in spheres' image, and can fail to capture rapidly varying features in a(r). Consequently, results for the particle's position and characteristics obtained from interpolated fits differ slightly from reference value obtained with two-dimensional fits. Under circumstances where precision can be sacrificed for speed, the convergence tolerances on both one- and two-dimensional fits can be relaxed to obtain results with fewer optimization cycles. For instance, accepting tracking errors of 5 nm in plane and 20 nm in the axial direction yields a tracking rate for a 201×201 pixel image of 2 frames/s on a 3.2 GHz Intel Core 2 Duo processor, as shown in FIG. 2.

More substantial gains can be obtained by combining the Lorenz-Mie formalism with exploiting the parallel processing capabilities of a graphical processing unit (GPU) typically used in high-end computer graphics cards. Further detail concerning the GPU will be illustrated hereinafter in reference to FIG. 8 and the computer 200. Whereas conventional CPU-based implementations operate on each pixel in sequence, a GPU-enabled algorithm operates on all pixels simultaneously. We implemented a GPU-enabled computation of $f_s(kr)$ using the GPUlib (Tech-X Corp., Boulder, CO) extensions to IDL on an nVidia 280 GTX graphics card (nVidia Corp., Santa Clara, CA) installed in the host computer. GPUlib provides access to the underlying CUDA framework for mathematical computation on GPUs without requiring the sophisticated programming techniques typically required to implement mathematical computations on GPUs. With these enhancements, two-dimensional fits run with full precision at nearly 3 frames/s, a factor of 20 faster than CPU-based analysis. Accepting 5 nm in-plane resolution and 50 nm axial resolution yields particle tracking and characterization data at more than 5 frames/s, as shown in FIG. 2. The GPU, furthermore, supports multi-threaded operation. When supported by a multi-core CPU, this means that several analyses can proceed in parallel, yielding a proportional increase in total processing speed. This may be considered to be real-time performance in some applications. The meaning of "real time" is that image data from each frame snapshot of image data is available for processing and use before the net frame snapshot arrives. As will be noted hereinafter this allows real time characterization of a particle of a sample, such as for example, of a sample's position, radius and index of refraction, and molecular level coatings like bead based molecular binding features. At least two of these parameters can be determined at a time and can even be all simultaneously. Substantial further acceleration could be attained by implementing the same fitting algorithm in an optimized compiled programming language.

Even if fitting to a particle's image proceeds rapidly enough for real-time applications, analyzing a snapshot requires a preliminary identification of the particles of the sample 110 in the field of view, and starting estimates for the particle's position, size and refractive index that are sufficiently accurate for the fit to converge to the globally optimal solution. This bootstrapping process must be both fast and reliable if holographic analysis is to be useful for unattended automated processing.

Figure 3A:
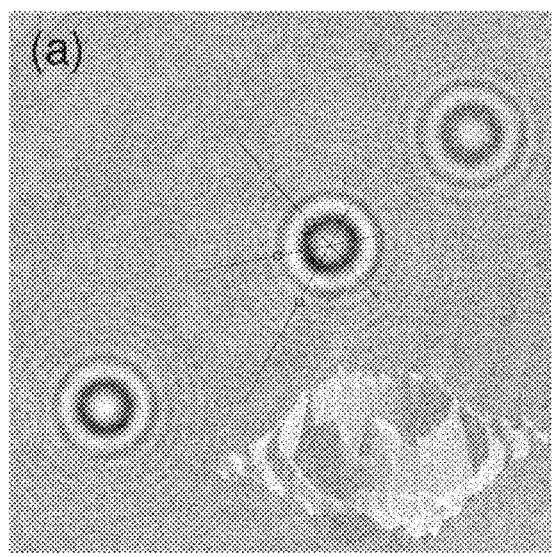
FIGS. 3A and 3B are, respectively, an original and transformed holographic images of three colloidal spheres; superimposed line segments in FIG. 3A indicate the "votes" cast by three representative pixels and intensity in FIG. 3B is scaled by the number of votes, with black representing 0 and white representing 800 votes and superimposed surface plots illustrate the middle sphere's transformation (Scale bar indicates 10 μm.)
Figure 3B:
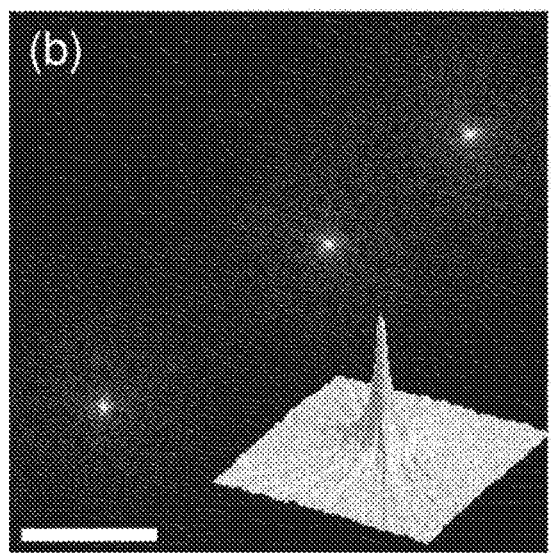

Each sphere appears in a snapshot, such as the example in FIG. 3A, as concentric bright and dark rings. The gradient of the intensity at each pixel therefore defines a line segment in the imaging plane along which a sphere's center may lie. The intersection of such lines defines an estimate for the particle's centroid in the focal plane. In the most preferred embodiment the particle is a sphere. We identify such intersections with a simplified variant of the circular Hough transform in which each pixel in the original image casts "votes" for the pixels in the transformed image that might be centroids. FIG. 3A indicates the votes cast by three representative pixels in the original image. The single-pixel votes are accumulated in a transformed image, such as the example in FIG. 3B. In this case, the transformed image has the same resolution as the original, a choice that yields both reasonable accuracy and speed. Those pixels in the transformed image with the most votes are taken to be centroid candidates, and their locations used as the in-plane coordinates to initialize fits. The inset surface plots demonstrate how the extended interference pattern due to a single sphere is transformed into a sharply defined peak, even if two or more spheres' holographic images overlap. This methodology is more computationally efficient than the conventional circular Hough transform, which uses additional resources to record information about each potential circular region's radius. Refining the centroid estimate by computing the brightness-weighted center of brightness for each feature in the transformed image typically identifies particles' centroids to within a few tenths of a pixel, or a few tens of nanometers.

Having estimated a particle, or sphere's, in-plane coordinates, we then estimate its axial coordinate by back-propagating the measured light field using the Rayleigh-Sommerfeld propagator. Peaks in the reconstructed axial intensity correspond with particle positions to within 100 nm, even when particles occlude each other along the optical axis. This back-propagation can be performed with a one-dimensional slice of image data, centered on the particle's position, and therefore can be performed very rapidly.

Figure 4:
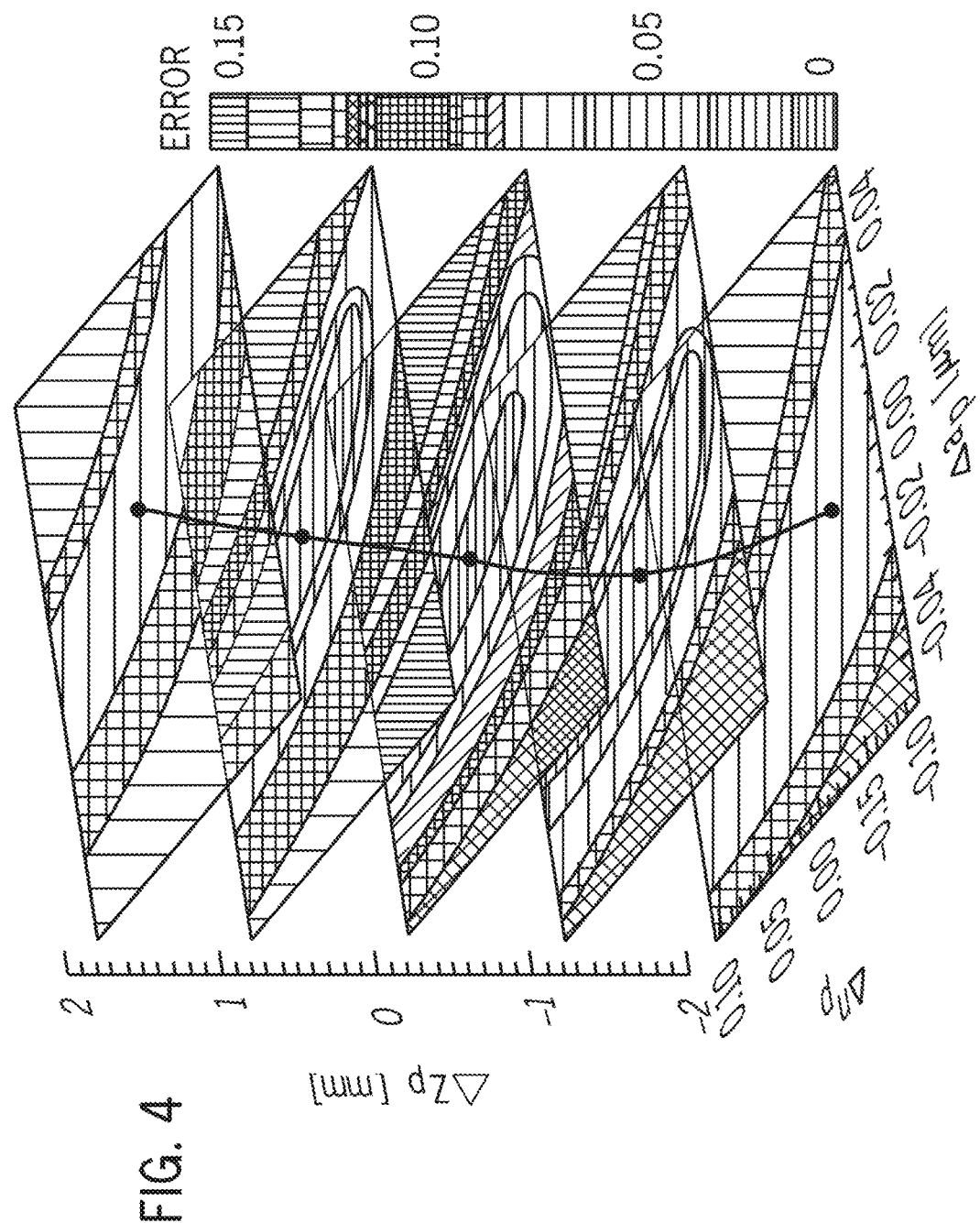
FIG. 4 show the root-mean-square error in the hologram estimated for a 1.5 μm diameter silica sphere in water as a function of the error in radius, $\Delta a_p$, refractive index, $\Delta n_p$, and axial position $\Delta z_p$, where the curve indicates the path of minimum error parameterized by $\Delta z_p$.

Accurately estimating the size and refractive index of an unknown particle is substantially more difficult. Fortunately, the error surface for the nonlinear fits slopes smoothly and monotonically toward the globally optimal values over a very large catchment basin in the parameter space defined by $a_p$, $n_p$, and $z_p$. FIG. 4 shows the root-mean-square error in the local image intensity computed for a 1.5 mm diameter silica sphere in water at $z_p=20$ mm, as a function of $\Delta a_p$, $\Delta n_p$, and $\Delta z_p$, errors in the radius, refractive index and axial position of the particle, respectively. These data demonstrate that fits to such a particle's image should converge to the optimal values even if the initial estimates are in error by more than 0.1 in the refractive index, 0.5 mm in the radius and 2 mm in the axial position. The error surface becomes more highly structured, and thus less forgiving, if the estimated in-plane centroid is in error by more than a hundred nanometers or so. Fortunately, the voting algorithm routinely yields sufficiently accurate results to ensure robust convergence. Tracking a particle through a sequence of images can be further accelerated by using the results from one fit as the initial estimates for the next. In this case, no additional pre-fitting is required.

The combination of rapid centroid identification and accelerated image fitting yields accurate and highly precise measurements of colloidal spheres' positions and characteristics in near or in real time as described hereinbefore. Unattended holographic particle tracking and characterization should find numerous applications in process control and quality assurance as well as in high-throughput and combinatorial assays. Substantial further acceleration should be possible through more aggressive software optimization and parallelization, without recourse to exotic hardware solutions.

Figure 5A:
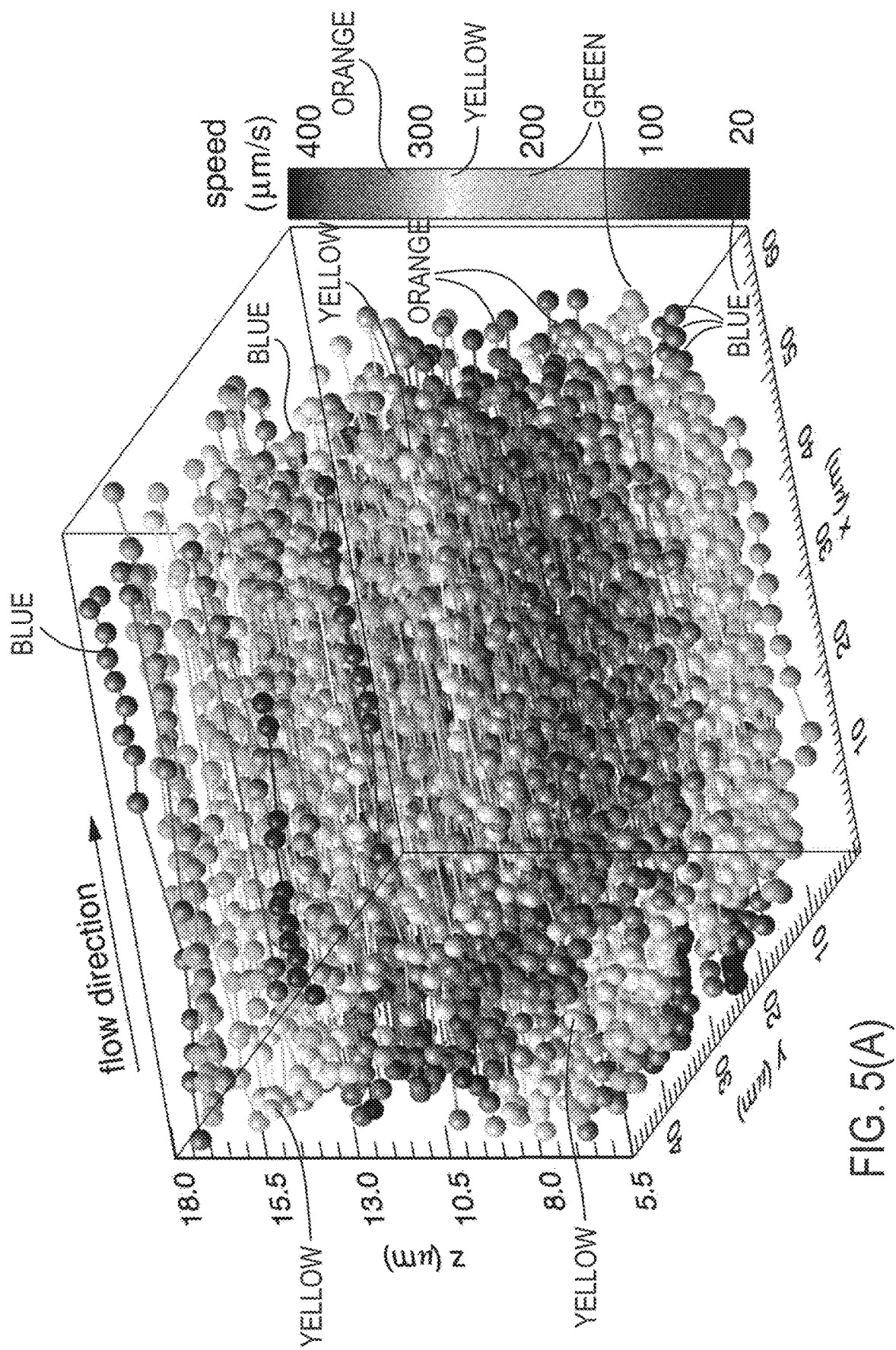
FIG. 5A shows holographic particle image velocimetry measured through dimensional trajectories of 500 colloidal spheres traveling down a microfluidic channel in a pressure driven flow with each sphere representing the particle position in one field of a holographic snapshot and features from field sequences are linked into trajectories with gray scale showing a range of particle measured speeds.

Holographic particle tracking has immediate applications for three-dimensional particle image velocimetry. FIG. 5A shows an example in the form of the superimposed trajectories of 500 individual one micrometer-diameter polystyrene spheres (Duke Scientific, catalog number 5100A) travelling down a 2 cm long microfluidic channel of 100 μm width and 17 μm depth. The spheres were dispersed in water at a volume fraction of $10^{-5}$, and were advected by a pressure-driven flow of water created by raising a reservoir against gravity. Images were obtained in a 50×70 μm$^2$ area near the middle of the channel, with the focal plane set roughly 5 μm below the lower glass/water interface. Spheres' locations in each snapshot are linked with a maximum-likelihood formalism approach into single-particle trajectories, $r_p(t)$, sampled at $\frac{1}{60}$ s intervals. Not every time step is represented in each particle's trace because faster-moving particles near the mid-plane of the flow occasionally obscure slower-moving particles near the walls. FIG. 5A presents only those particle positions that were identified unambiguously. Even such incomplete time series can be used to estimate the particles' instantaneous velocities. The traces in FIG. 5A are of a gray scale according to the trajectory-averaged speed.

Figure 5B:
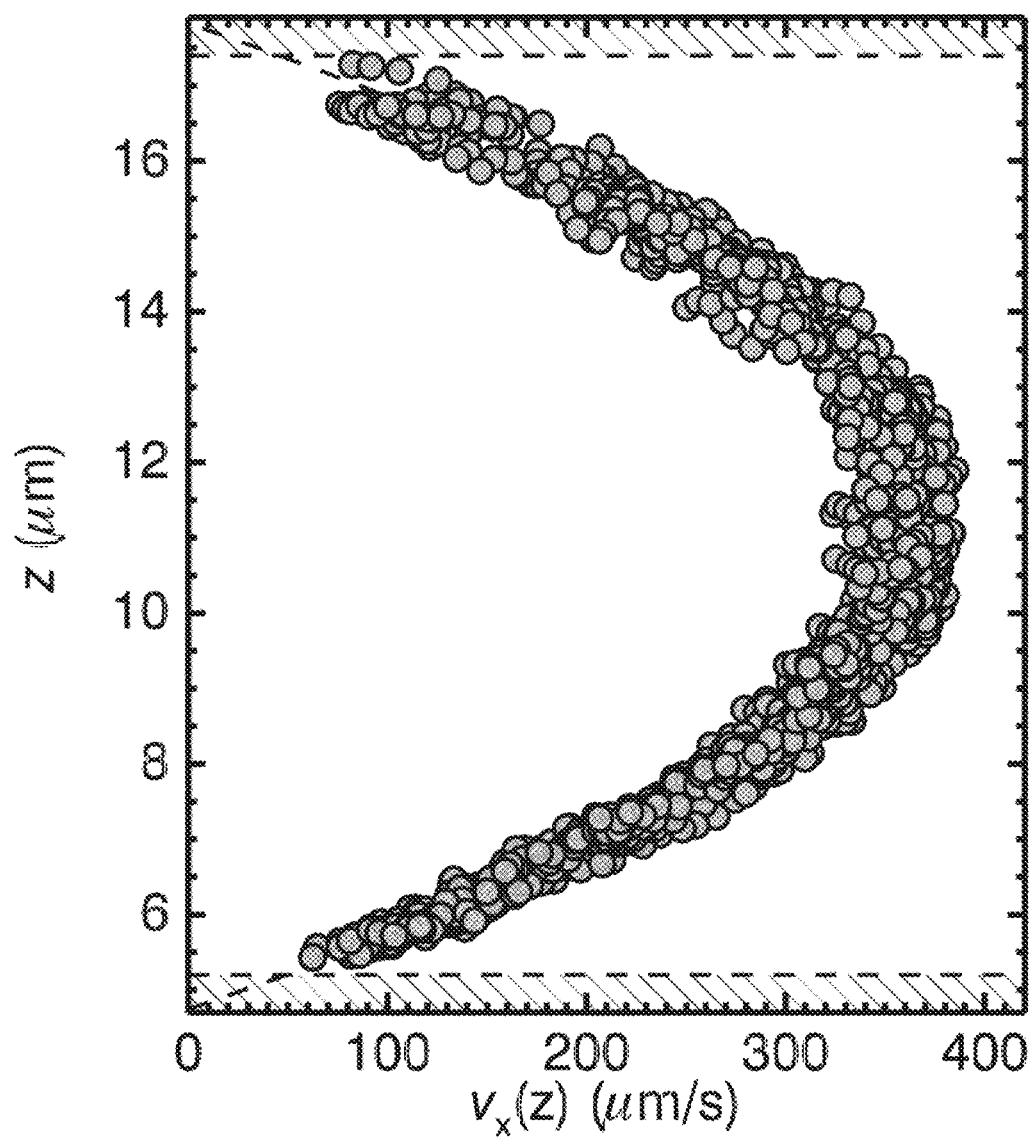
FIG. 5B shows a Poiseuille flow profile along the vertical direction attained from FIG. 5A data with particles excluded from the shaded region by interactions with upper and lower glass walls of the channel (the dashed curve is a fit to the anticipated parabolic flow profile)

These trajectories also are useful for mapping the three-dimensional flow field. Each point in FIG. 5B represents one particle's speed as a function of its mean height, z, in the microfluidic channel. The superimposed results of 1000 such trajectories clearly show the parabolic flow profile expected for Poiseuille flow down a channel, the width of the cluster of data reflecting spatial variations across the long horizontal axis of the channel. The limits of the vertical axis indicate the positions of the channel's upper and lower walls, with heights being reported relative to the microscope's focal plane. The dashed horizontal lines represent the region of the flow into which particles cannot wander because of their hard-sphere interaction with the glass walls. The fit parabola shows the flow vanishing at the channel's boundaries.

Each trajectory also yields trajectory-averaged measurements of the radius and refractive index for each particle individually. Combining multiple measurements on a single particle minimizes systematic errors due to inevitable position-dependent variations in the illumination. The results in FIG. 6A(1)-A(3) show the radii and refractive indexes of the spheres in a commercial sample of polystyrene microspheres dispersed in water. FIG. 6A(2) and A(3) show the 2D histograms taken from FIG. 6A(1). The mean radius of $a_p=0.4995$ µm agrees with the manufacturer's specification obtained by conventional light scattering, as does the measured 2.5 percent polydispersity in the radius. The mean refractive index of $n_p=1.595$ is consistent with independent measurements on polystyrene spheres.

Single-particle characterization is a substantial benefit of holographic characterization compared with bulk light-scattering measurements, which are the usual basis for analyzing particle dispersions. Building up distributions such as the example in FIGS. 6A(1)-A(3) from single-particle measurements eliminates the need for population models, and thus affords more general insights into a sample's composition. For example, the anticorrelation between the particles' size and refractive index evident in FIGS. 6A(1)-A(3) would not be apparent in light scattering data. No such anticorrelation is apparent in holographic analyses of homogeneous fluid droplets. One interpretation of this observation is that the larger spheres in the emulsion polymerized sample are more porous, and consequently have lower refractive indexes.

Simultaneously tracking and characterizing individual particles(and in real time as described hereinbefore) enables us to confirm our results' freedom from motion-based artifacts. Colloidal particles' images become blurred if they move during the period that the camera's shutter is open. This blurring introduces substantial artifacts into conventional bright-field video microscopy data. As the results in FIGS. 6B(1) and B(2) demonstrate, however, motion blurring has no discernible influence on values for the radii and refractive indexes as a function of mean speed obtained by holographic analysis for speeds as high as 500 µm/s. Additional measurements reveal deviations from the population average values only for peak flow speeds exceeding 700 µm/s.

This robustness is surprising because particles travelling at several hundred micrometers per second traverse several of our camera's pixels during its 1 ms shutter period. The resulting incoherent average of the oscillatory scattering pattern serves primarily to reduce the contrast in the direction of motion, however, and so has little influence on the Lorenz-Mie fit. Even this amount of blurring could be reduced through the use of a faster shutter or a pulsed laser for illumination.

Being able to characterize individual colloidal particles in real time as they travel down a microfluidic channel provides an effective basis for detecting molecular-scale coatings on functionalized beads. If the individual spheres' radii were known to within a nanometer or so, then the presence of a molecular coating of similar refractive index could be discerned in the apparent increase in the radius. More generally, the characteristics of a treated sample can be compared with control measurements on untreated spheres.

Figure 7A:
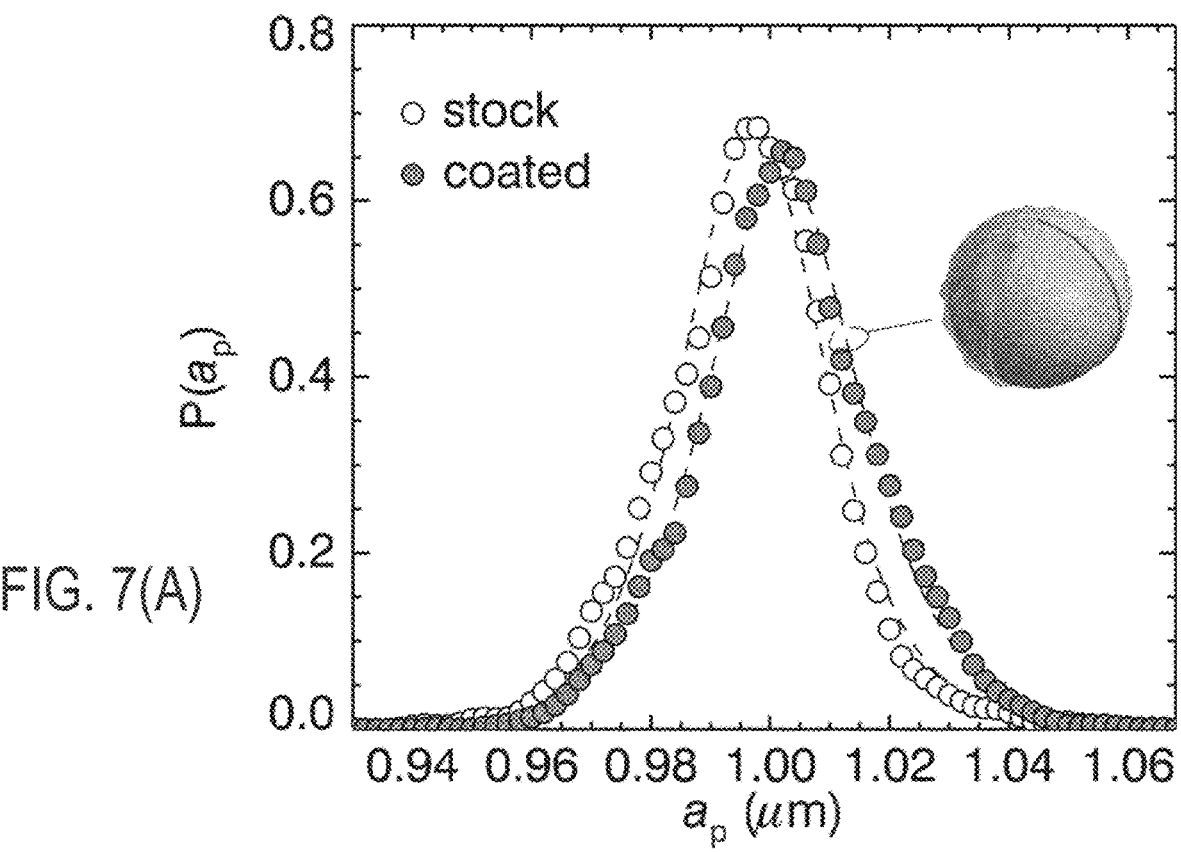
FIG. 7A shows detection of avidin binding to biotinylated polystyrene spheres with light circles the probability distribution for measured particle radius in stock spheres with dark circles having a corresponding distribution for a sample of the sphere after incubation with neutravidin (dashed curves are guides for the eye)
Figure 7B:
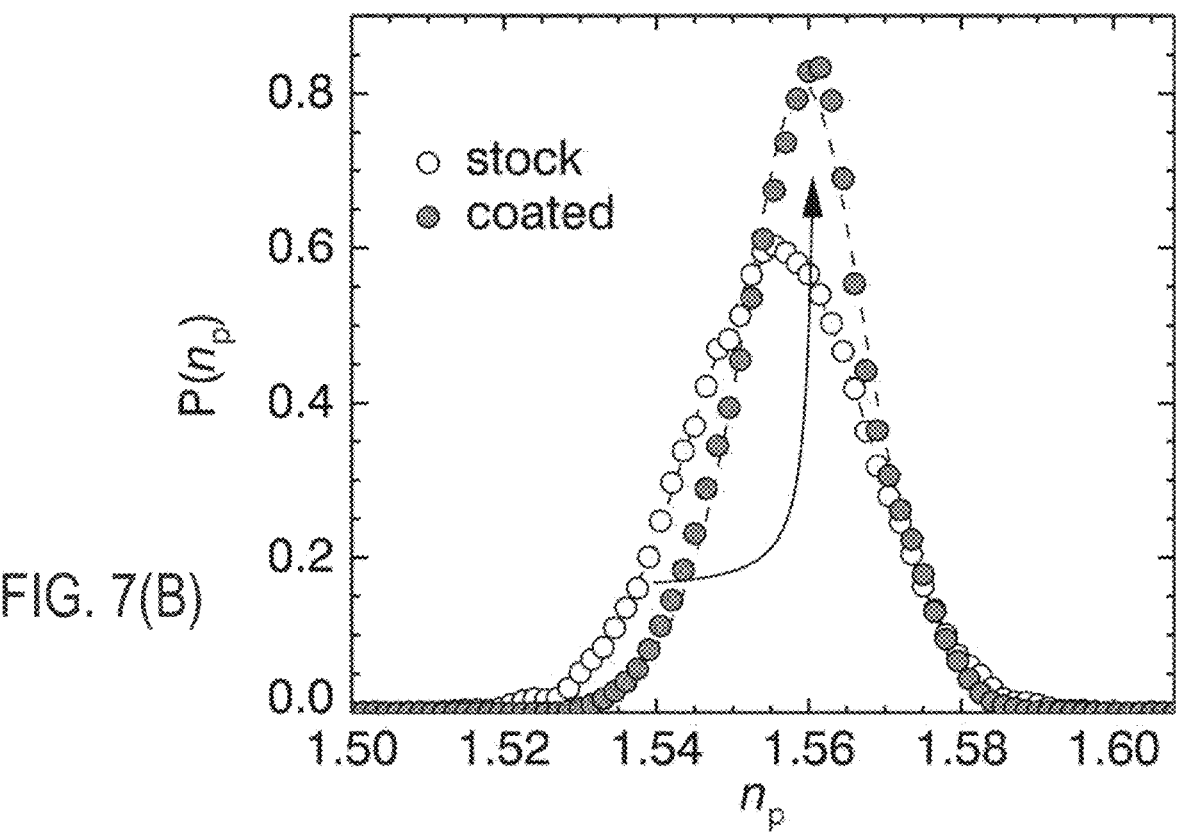
FIG. 7B is the equivalent distribution for particles' refractive indices with the arrow indicating redistribution of probabilities from a low density tail in a stock sample to the peak in the coated sample.

FIGS. 7(A) and 7(B) shows one such comparative example study of 2 µm diameter biotinylated polystyrene spheres before and after incubation with neutravidin. The biotinylated polystyrene spheres used in this study were obtained from Polysciences Inc (Warrington, PA) (catalog number 24172). Neutravidin was obtained from Invitrogen (Carlsbad, CA) (catalog number A2666). A neutravidin solution at a concentration of 1 mg/mL was prepared by adding 1 mg of neutravidin to 1 mL of phosphate buffer saline (PBS) (50 mM, [NaCl]=50 mM). The stock sample of beads was obtained by adding 10 µL of the as-delivered dispersion to 990 µL of PBS. The coated sample was prepared by adding 10 µL of the as-delivered dispersion to 990 µL of neutravidin solution. Particles were incubated and shaken at room temperature for 1 hr before they were introduced into the microfluidic channels by capillary action. Flow was induced by introducing a slip of absorbent paper into one end of the channel and images recorded until results were obtained for 1,000 spheres from each sample. Each data set consisted of roughly 5,000 holographic measurements, which were obtained over the course of roughly 5 min.

From these measurements, we determined that the untreated sample has a population averaged radius of 0:996±0:015 µm (see FIG. 7A), consistent with the manufacturer's specification. The incubated population appears to some 6 nm larger, with an average radius of 1:002±0:015 µm. Even though the two size distributions plotted in FIG. 7A overlap substantially, a Wilcoxon rank-sum test demonstrates that their means differ with better than 99 percent certainty. This then constitutes a statistically significant detection of change in the treated sample's radius, which can reasonably be ascribed to the presence of a molecular-scale coating. The coating's thickness, in this case, is consistent with the size of a multi-domain avidin derivative.

Pronounced differences between the two samples also are evident in the measured distribution of refractive indexes, plotted in FIG. 7B. The incubated sample's distribution is significantly sharper, presumably because protein, whose refractive index is similar to that of polystyrene, displaces water in the spheres' porous surfaces, and raises their effective refractive indexes. This would affect the more porous particles on the lower side of the refractive index distribution more than the denser particles on the high side, thereby sharpening the distribution. The arrow in FIG. 7B indicates this redistribution.

Similar analyses of random samples of the two data sets further confirm that the particles from the untreated sample all come from the same population, whose size and refractive index is consistent with the manufacturer's specification. The treated samples, by contrast show more variability in size, possibly because the thickness and evenness of the bound avidin layer can vary from sphere to sphere.

These results demonstrate the utility of hardware-accelerated digital video microscopy for detecting in real time molecular-scale coatings on functionalized colloidal spheres. Unlike conventional molecular binding assays, holographic analysis does not require fluorescent or radiological markers, and so eliminates the effort and expense ordinarily required to label molecules bound to beads.

Figure 8:
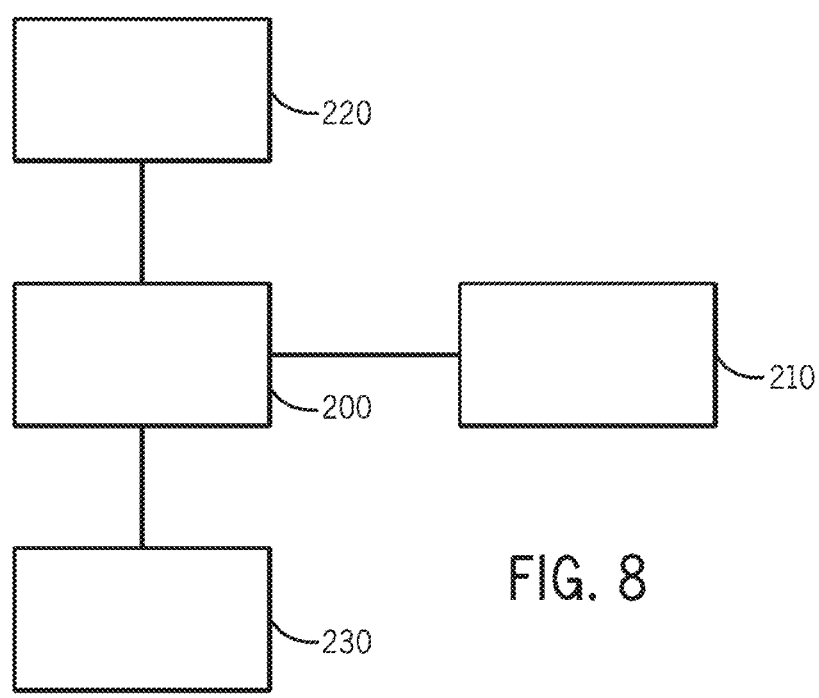
FIG. 8 shows a schematic block diagram of a computer system for implementing the methods of the invention.

In one embodiment of the invention the method of the invention can be implemented to determine parameters and features of interest by use of the computer system shown in FIG. 8. The system of FIG. 8 includes a computer 200 (which can include a CPU and/or GPU in a most preferred embodiment as described herein in connection with Lorenz-Mie analysis) which can execute a computer readable medium, such as a computer software module with instructions which are embedded, for example, in a computer addressable storage medium 210. The use of the GPU in the computer 200 thereby allows real time analysis and simultaneous evaluation of parameters such as molecular coatings and/or of a particle's position, radius and index of refraction. This storage medium 210 can be read/writeable which enables data to be written thereto. This feature allows subsequent static or dynamic data analysis; and results of that analysis allow a user to act on that information for advantageous applications. The computer 200 executes the computer software module instructions to analyze data produced by the previously described methods of the invention. Such data can be obtained from the storage medium 210 and input via device 220. Other conventional devices, such as an output device 230 (e.g., a display, printer and/or a storage medium) can enable viewing and further data analysis. Such analysis can yield information about the position and characteristics of particles in real time or delayed time.

Certain embodiments described hereinbefore use holographic video microscopy in a single wavelength to detect molecular-scale coatings on micrometer-diameter dielectric colloidal spheres. This detection was accomplished by analyzing a population of spheres that had been exposed to the coating molecules and comparing the results with those obtained by analyzing a comparable population of spheres that had not been exposed. Holographic snapshots of individual spheres in each population were analyzed with the Lorenz-Mie theory of light scattering to obtain estimates for the sphere's radius and complex refractive index. Lorenz-Mie analysis yields each sphere's radius with nanometer resolution and its refractive index to within a part in a thousand. The systematic differences in the population distributions of these properties constitute the basis for detecting the molecules. Coated spheres appear systematically larger by an amount consistent with the thickness of the coating.

In an alternative embodiment, the Lorenz-Mie analysis can employ two-color or multi-color holograms to provide comparable detection resolution using only a single sphere, rather than populations of spheres. Thus the input beam 120 in FIG. 1A provides an output of a multi-color hologram. This embodiment creates simultaneous holographic images in two or more wavelengths. These multi-color holograms can be recorded on separate video cameras 135 (see FIG. 1A) using filters to separate the images. Alternatively, they can be recorded with a color camera 135, and the separate images obtained from the recorded color channels.

The spheres used for these types of measurements should have comparable optical properties in the wavelengths used. The coating, however, should have strongly differing properties in at least two of the wavelengths. For instance, the coating might be a pure dielectric in one wavelength and strongly absorbing in another. In the absence of a coating, holograms obtained in multiple wavelengths should yield identical results for the particle's position and size. Coated spheres' holograms should differ significantly in the estimated size and in the qualitative features of the estimated refractive index obtained from each wavelength. Such differences would constitute a detection of the molecular-scale coating. Suitable choice of wavelength, sphere size and sphere composition should provide quantitative information on the thickness or completeness of the coating.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of characterizing a parameter of a sample by holographic microscopy, comprising the steps of:
   receiving holographic image data of the sample from a storage medium;
   determining a first estimate of the number of objects in the holographic image data, each object associated with a set of concentric bright and dark rings;
   determining, for each set of concentric bright and dark rings, by a voting algorithm, a centroid defined by an approximate x, y position in a plane, with each pixel of the image data voting for pixels in a transformed image that may be centroids;
   determining an estimate of the axial position (z) of each of the objects;
   determining by Lorenz-Mie analysis an estimate of each of the objects' radius and refractive index;
   using holographic image data from the sample to characterize properties of the sample and generate information characteristic of the parameters of the sample; and
   comparing the estimate of each object's radius with control holographic image data corresponding to a known radius of a control object.

2. The method as described in claim 1 wherein the step of providing the image data includes generating multiple beams of polarized light, each of the multiple beams having a different wavelengths and scattering each of the multiple beams off the sample, wherein the holographic image data is multi-color hologram data.

3. The method as defined in claim 1 wherein an associated plurality of holograms are formed by interaction between the sample and the plurality of wavelengths of coherent light, thereby enabling determination of different responses of the sample to the different wavelengths of coherent light and analyzing the different response to identify the parameters of the sample.

4. The method as defined in claim 1 wherein determining the centroid further includes determining the Lorenz-Mie functionality scattering function $f_s(kR)$ along a line segment $R=|r-r_p|$ and interpolating to obtain a function $f_s(k(r-r_p))$ thereby reducing processing time and providing real time analysis of the sample.

5. The method as defined in claim 1 further including the steps of performing the Lorenz-Mie analysis and obtaining comparisons between of the image data a particle being in an untreated state and another particle having undergone a treatment, thereby enabling real time characterization of molecular layers present on the treated particle versus the untreated particle.

6. The method as defined in claim 5 wherein the real time characteristics are selected from the group of index of refraction and particle radius.

7. The method as defined in claim 1 further including the step of estimating in-plane co-ordinates of the particle by the Lorenz-Mie analysis and then estimating axial coordinate of the particle by back-propagating the measured light field applying a Rayleigh-Sommerfeld propagator.

8. The method as defined in claim 1 wherein the analysis step includes applying a Levenburg-Marquardt fitting routine to identify the in-plane co-ordinate within 3 nm.

9. The method as defined in claim 1 further including the steps of determining velocity of the particle in a flowing form.

10. The method as defined in claim 9 further including the step of mapping a three-dimensional flow field of the particle.

11. The method as defined in claim 9 wherein the step of analyzing the information comprises simultaneously tracking and characterizing individual ones of the particles, thereby avoiding motion induced artifacts of the characteristics of the particles.

12. The method as defined in claim 1 wherein the step of measuring includes identifying molecular-scale coatings on functionalized forms of the particle by detecting variations in apparent increase in radius.

13. A system for characterizing a parameter of a sample by holographic microscopy, comprising:
    a holographic microscope including a laser beam source and an objective lens, the laser beam scattering from the sample and interacting with an unscattered portion of the laser beam to provide a holographic scattering pattern;
    an image collection device for collecting image data characteristic of the scattering pattern from the holographic microscope; and
    a computer system including a processor and memory, the memory having stored thereon computer readable instructions, the computer readable instructions configured to:
        analyze the image data via computer software executed by the computer system, the computer software including a Lorenz-Mie methodology and executed by a graphical processing unit to provide substantially real time output of parameters characteristic of the sample;
        receive holographic image data of the sample;
        determine a first estimate of the number of objects in the holographic image data, each object associated with a set of concentric bright and dark rings;
        determine, for each set of concentric bright and dark rings, by a voting algorithm, a centroid defined by an approximate x, y position in a plane, with each pixel of the image data voting for pixels in a transformed image that may be centroids;
        determine an estimate of the axial position (z) of each of the objects;
        determine by Lorenz-Mie analysis an estimate of each of the objects' radius and refractive index;
        compare one of the radius and refractive index for each of the objects the same of radius or refractive index of a control uncoated sample; and
        determine for each one of the objects if that one object is coated.

14. The system of claim 13, wherein the holographic microscope includes a plurality of laser beams corresponding to multiple wavelengths and wherein the computer readable memory is configured to receive multi-color holographic image data.

15. The method as described in claim 14 wherein each of the plurality of laser beams are configured to engage a microfluidic channel having the plurality of particles.

16. A method of characterizing a parameter of a sample by holographic microscopy, comprising the steps of:
    receiving multicolor holographic image data of the sample from a storage medium;
    determining a first estimate of the number of objects in the holographic image data, each object associated with a set of concentric bright and dark rings;
    determining, for each set of concentric bright and dark rings, by a voting algorithm, a centroid defined by an approximate x, y position in a plane, with each pixel of the image data voting for pixels in a transformed image that may be centroids;
    determining an estimate of the axial position (z) of each of the objects;
    determining by Lorenz-Mie analysis an estimate of each of the objects' radius, refractive index;
    using holographic image data from the sample to characterize properties of the sample and generate information characteristic of the parameters of the sample; and
    analyzing the information characteristic of the sample parameters and determining in real time simultaneously size, position and refractive index of a particle of the sample.

17. The method as defined in claim 16, wherein determining the centroid further includes determining the Lorenz-Mie functionality scattering function $f_s(kR)$ along a line segment $R=|r-r_p|$ and interpolating to obtain a function $f_s(k(r-r_p))$ thereby reducing processing time and providing real time analysis of the sample.

18. The method as defined in claim 16, further including the steps of performing the Lorenz-Mie analysis and obtaining comparisons between of the image data a particle being in an untreated state and another particle having undergone a treatment, thereby enabling real time characterization of molecular layers present on the treated particle versus the untreated particle.

19. The method as defined in claim 18, wherein the real time characteristics are selected from the group of index of refraction and particle radius.

* * * * *